(12) United States Patent
Tokuchi

(10) Patent No.: US 11,119,706 B2
(45) Date of Patent: *Sep. 14, 2021

(54) INFORMATION PROCESSING DEVICE AND NON-TRANSITORY COMPUTER READABLE MEDIUM FOR NOTIFICATION OF LINKAGE FUNCTION

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/568,291

(22) Filed: Sep. 12, 2019

(65) Prior Publication Data

US 2020/0004468 A1    Jan. 2, 2020

Related U.S. Application Data

(63) Continuation of application No. 15/990,834, filed on May 29, 2018, now Pat. No. 10,416,933.

(30) Foreign Application Priority Data

Sep. 11, 2017    (JP) .............................. JP2017-174218

(51) Int. Cl.
*G06F 3/12*   (2006.01)
*H04N 1/00*   (2006.01)
*H04N 1/32*   (2006.01)

(52) U.S. Cl.
CPC .......... *G06F 3/1203* (2013.01); *G06F 3/1204* (2013.01); *G06F 3/1226* (2013.01);
(Continued)

(58) Field of Classification Search
None
See application file for complete search history.

(56) References Cited

U.S. PATENT DOCUMENTS 9,419,923 B2   8/2016 Seo et al.
9,977,632 B2   5/2018 Yoshida
(Continued)

FOREIGN PATENT DOCUMENTS

CN      1530860     9/2004
CN    101131627     2/2008
(Continued)

OTHER PUBLICATIONS

Office Action of Japan Counterpart Application, with English translation thereof, dated Jun. 8, 2021, pp. 1-6.
(Continued)

*Primary Examiner* — Thomas D Lee
(74) *Attorney, Agent, or Firm* — JCIPRNET

(57) ABSTRACT

An information processing device includes a controller that controls a notification of a linkage function executable by using plural devices, by transmitting information of the plural devices to an operation assistant. In a further modification of the invention, the controller may control the notification of the linkage function when an image as the information is connected to an image associated with the operation assistant.

17 Claims, 19 Drawing Sheets

(52) U.S. Cl.
CPC .......... *G06F 3/1232* (2013.01); *G06F 3/1236* (2013.01); *G06F 3/1288* (2013.01); *H04N 1/00127* (2013.01); *H04N 1/3255* (2013.01); *H04N 1/32539* (2013.01); *H04N 2201/0075* (2013.01)

(56) References Cited

U.S. PATENT DOCUMENTS

| | | | |
|---|---|---|---|
| 10,048,915 B2 | 8/2018 | Cho | |
| 2004/0244039 A1* | 12/2004 | Sugahara | G06F 16/951 725/52 |
| 2007/0076228 A1* | 4/2007 | Apelbaum | H04L 41/06 358/1.1 |
| 2008/0049249 A1* | 2/2008 | Tomita | G06F 3/1264 358/1.15 |
| 2008/0288621 A1* | 11/2008 | Snell | G06Q 10/06 709/223 |
| 2009/0323096 A1* | 12/2009 | Oshima | G06Q 10/06 358/1.13 |
| 2012/0140284 A1 | 6/2012 | Tashiro et al. | |
| 2014/0063542 A1 | 3/2014 | Aoki | |
| 2016/0225372 A1* | 8/2016 | Cheung | G10L 15/22 |
| 2016/0266863 A1* | 9/2016 | Song | G06F 3/04845 |
| 2017/0210394 A1* | 7/2017 | Yamada | B62D 6/00 |
| 2017/0322691 A1 | 11/2017 | Tokuchi | |
| 2021/0051242 A1 | 2/2021 | Tokuchi | |

FOREIGN PATENT DOCUMENTS

| | | |
|---|---|---|
| CN | 103660641 | 3/2014 |
| CN | 105554338 | 5/2016 |
| CN | 105718224 | 6/2016 |
| JP | 2008052344 | 3/2008 |
| JP | 2014170524 | 9/2014 |
| JP | 6024848 | 11/2016 |
| JP | 6052458 | 12/2016 |

OTHER PUBLICATIONS

"Office Action of China Counterpart Application", dated Apr. 2, 2021, with English translation thereof, pp. 1-24.

* cited by examiner

<DEVICE FUNCTION MANAGEMENT TABLE>

| DEVICE ID | DEVICE NAME (TYPE) | FUNCTION | IMAGE ID |
|---|---|---|---|
| A | PC | DISPLAYING FUNCTION, SAVING FUNCTION, ··· | ··· |
| B | MULTIFUNCTION MACHINE | PRINTING FUNCTION, SCANNING FUNCTION, COPYING FUNCTION, FAXING FUNCTION, POST-PROCESSING FUNCTION, ··· | ··· |
| C | PROJECTOR | PROJECTING FUNCTION, ··· | ··· |
| ··· | ··· | ··· | ··· |

<LINKAGE FUNCTION MANAGEMENT TABLE>

| DEVICE ID COMBINATION | DEVICE NAME (TYPE) | LINKAGE FUNCTION |
|---|---|---|
| A, B | PC A, MULTIFUNCTION MACHINE B | SCANNING TRANSMITTING FUNCTION |
| | | PRINTING FUNCTION |
| A, C | PC A, PROJECTOR C | PROJECTING FUNCTION |
| | | PRINTING FUNCTION |
| B, C | MULTIFUNCTION MACHINE B, PROJECTOR C | PROJECTING FUNCTION |
| | | PRINTING FUNCTION |
| ... | ... | ... |

<LINKAGE FUNCTION MANAGEMENT TABLE>

| DEVICE ID COMBINATION | DEVICE NAME (TYPE) | LINKAGE FUNCTION | ACCESS ORDER | PRIORITY |
|---|---|---|---|---|
| A, B | PC A, MULTIFUNCTION MACHINE B | SCANNING TRANSMITTING FUNCTION | B→A | 1 |
| | | | A→B | 2 |
| | | PRINTING FUNCTION | A→B | 1 |
| | | | B→A | 2 |
| A, C | PC A, PROJECTOR C | PROJECTING FUNCTION | A→C | 1 |
| | | | C→A | 2 |
| | | ... | C→A | 1 |
| | | | A→C | 2 |
| ... | ... | ... | ... | ... |

FIG.19

<DEVICE FUNCTION MANAGEMENT TABLE>

| DEVICE ID | DEVICE NAME (TYPE) | POSITION IN IMAGE | FUNCTION | IMAGE ID |
|---|---|---|---|---|
| A | PC | ... | SCREEN DISPLAYING FUNCTION | ... |
| | | ... | DATA SAVING FUNCTION | |
| | | ... | ... | |
| B | MULTIFUNC-TION MACHINE | ... | PRINTING FUNCTION | ... |
| | | ... | SCANNING FUNCTION | |
| | | ... | STAPLING FUNCTION | |
| | | ... | ... | |
| ... | ... | ... | ... | ... |

FIG.22

<DEVICE FUNCTION MANAGEMETN TABLE>

| DEVICE ID | DEVICE NAME (TYPE) | PORTION | PORTION ID | FUNCTION | PORTION IMANE ID |
|---|---|---|---|---|---|
| A | PC | DISPLAY UNIT | Aa | SCREEN DISPLAYING FUNCTION | ... |
| | | MAINBODY PROTION | Ab | DATA SAVING FUNCTION | ... |
| | | ... | ... | ... | ... |
| B | MULTI FUNC-TION MACHINE | MAAIN BODY PORTION | Ba | PRINTING FUNCTION | ... |
| | | READEING UNIT | Bb | SCANNING FUNCTION | ... |
| | | POSTPRO-CESSING DEVICE | Bc | STAPLING FUNCTION | ... |
| | | ... | ... | ... | ... |
| C | PROJECTOR | MAINBODY PORTION | Ca | PROJECTING FUNCTION | ... |
| | | ... | ... | ... | ... |
| ... | ... | ... | ... | ... | ... |

FIG.23

<LINKAGE FUNCTION MANAGEMENT TABLE>

| COMBINATION OF PORTIONS OF DEVICES | PORTION ID COMBINATION | LINKAGE FUNCTION |
|---|---|---|
| DISPLAY UNIT OF PC A, MAIN BODY PORTION OF MULTIFUNCTION MACHINE B | Aa、Ba | PRINTING FUNCTION |
|  | ... | ... |
| MAIN BODY PORTION OF MULTIFUNCTION MACHINE B, MAIN BODY PORTION OF PROJECTOR C | Ba、Ca | PRINTING FUNCTION |
|  | ... | ... |
| READING UNIT OF MULTIFUNCTION MACHINE B, MAIN BODY PORTION OF PROJECTOR C | Bb、Ca | SCANNING PROJECTING FUNCTION |
|  | ... | ... |

FIG.24

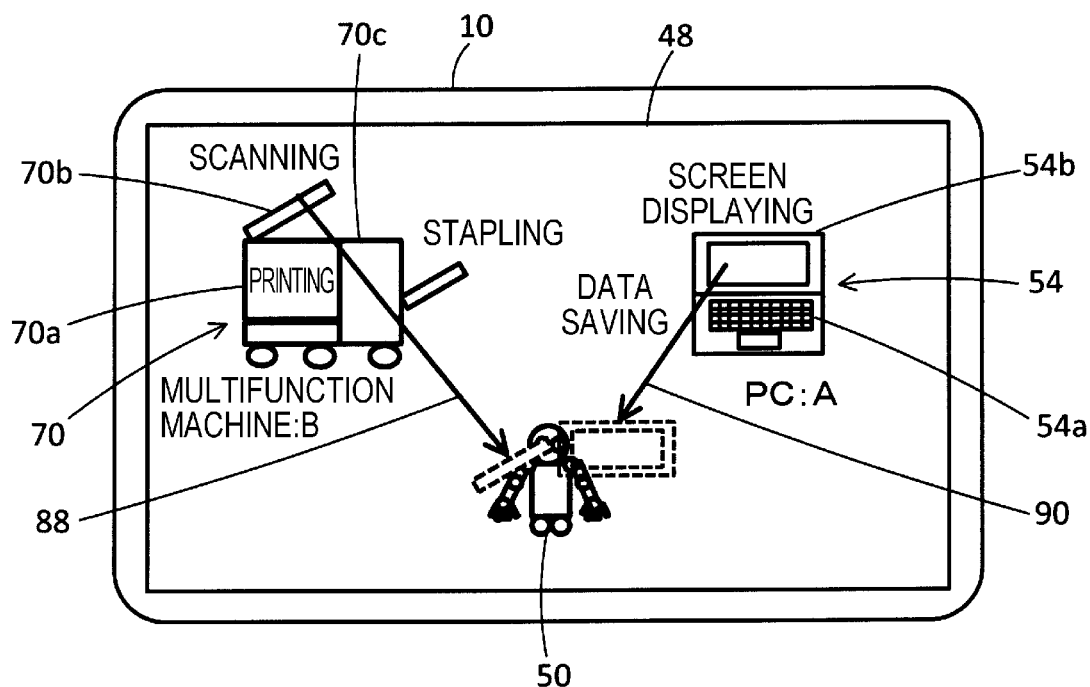

<LINKAGE FUNCTION MANAGEMENT TABLE>

| FUNCTION ID COMBINATION | FUNCTION NAME (TYPE) | LINKAGE FUNCTION |
|---|---|---|
| $\alpha, \beta$ | DATA TRANSMITTING ($\alpha$), PASSWORD SETTING ($\beta$) | ... |
|  |  | ... |
| $\alpha, \gamma$ | DATA TRANSMITTING ($\alpha$), MAKING SOUND ($\gamma$) | ... |
|  |  | ... |
| $\beta, \gamma$ | PASSWORD SETTING ($\beta$), MAKING SOUND ($\gamma$) | ... |
|  |  | ... |
| ... | ... | ... |

<LINKAGE FUNCTION MANAGEMENT TABLE>

| ID COMBINATION | DEVICE NAME, FUNCTION NAME (TYPE) | LINKAGE FUNCTION |
|---|---|---|
| A, α | PC(A)、 DATA TRANSMITTING (α) | ... ... |
| A, β | PC(A)、 PASSWORD SETTING (β) | ... ... |
| B, α | MULTIFUNCTION MACHINE (B)、 DATA TRANSMITTING (α) | ... ... |
| ... | ... | ... |

FIG.30

<LINKAGE FUNCTION MANAGEMENT TABLE>

| COMBINATION OF FILE FORMATS | LINKAGE FUNCTION |
|---|---|
| DOCUMENT FORMAT, TABLE FORMAT | • INSERT TABLE INTO DOCUMENT, • INSERT DOCUMENT INTO TABLE |
| DOCUMENT FORMAT, IMAGE FORMAT | • INSERT IMAGE INTO DOCUMENT • SUPERIMPOSE DOCUMENT ON IMAGE |
| DOCUMENT FORMAT, VIDEO FORMAT | • INSERT VIDEO INTO DOCUMENT • INSERT STILL IMAGE INTO DOCUMENT |
| DOCUMENT FORMAT, DOCUMENT FORMAT | • INTEGRATE DOCUMENTS WITH EACH OTHER |
| TABLE FORMAT, TABLE FORMAT | • INTEGRATE TABLES WITH EACH OTHER |
| VIDEO FORMAT, VIDEO FORMAT, | • INTEGRATE VIDEOS WITH EACH OTHER |
| SPREADSHEET FORMAT, DOCUMENT FORMAT | • INSERT DOCUMENT INTO PRESENTATION SHEET |
| ... | ... |

INFORMATION PROCESSING DEVICE AND NON-TRANSITORY COMPUTER READABLE MEDIUM FOR NOTIFICATION OF LINKAGE FUNCTION

CROSS-REFERENCE TO RELATED APPLICATIONS

This application is a continuation application of and claims the priority benefit of a prior application Ser. No. 15/990,834, filed on May 29, 2018, now allowed. The prior application is based on and claims priority under 35 USC 119 from Japanese Patent Application No. 2017-174218 filed Sep. 11, 2017.

BACKGROUND

Technical Field

The present invention relates to an information processing device and a non-transitory computer readable medium.

SUMMARY

According to an aspect of the invention, an information processing device includes a controller that controls a notification of a linkage function executable by using plural devices, by transmitting information of the plural devices to an operation assistant.

BRIEF DESCRIPTION OF THE DRAWINGS

Exemplary embodiments of the present invention will be described in detail based on the following figures, wherein:

FIG. 19 is a view illustrating a device function management table according to Modification 4;

FIG. 22 is a view illustrating another example of the device function management table according to Modification 4;

FIG. 23 is a view illustrating a linkage function management table according to Modification 4;

FIG. 24 is a view illustrating a screen;

FIG. 30 is a view illustrating a linkage function management table according to a fourth exemplary embodiment;

DETAILED DESCRIPTION

First Exemplary Embodiment

Figure 1:
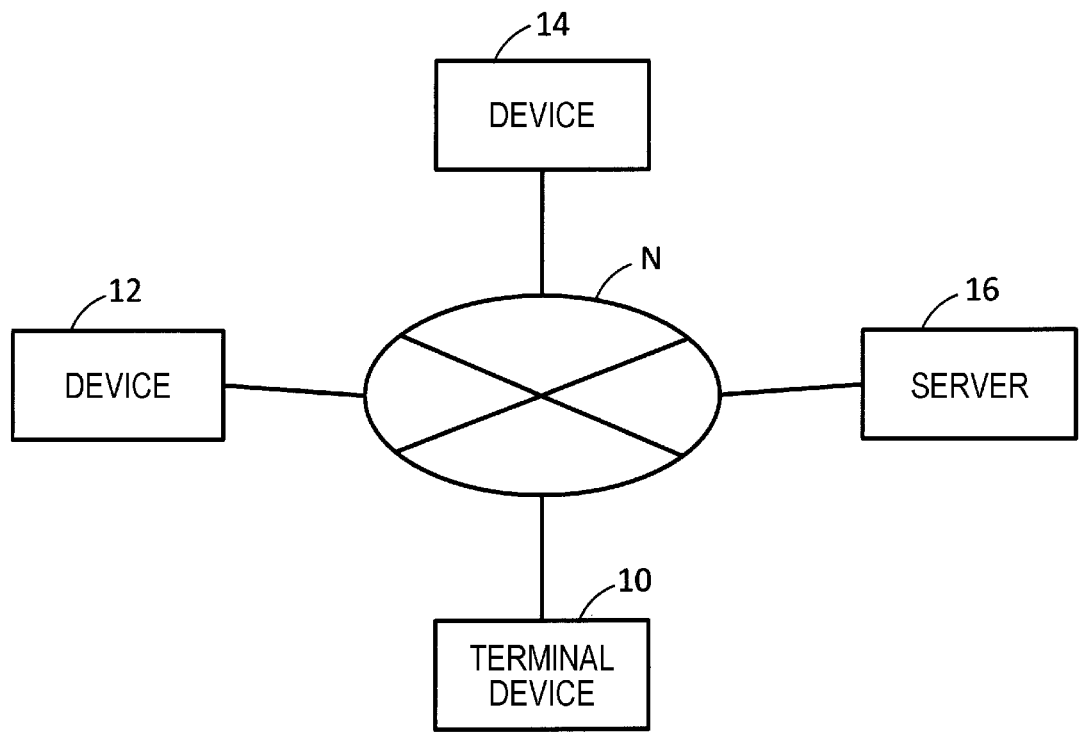
FIG. 1 is a block diagram illustrating a configuration of a device system according to a first exemplary embodiment of the invention.

Descriptions will be made on a device system which is an information processing system according to a first exemplary embodiment of the invention, with reference to FIG. 1. FIG. 1 illustrates an example of the device system according to the first exemplary embodiment.

The device system according to the first exemplary embodiment includes, for example, a terminal device 10, plural devices (for example, devices 12 and 14), and a server 16 which is an example of an external device. In the example illustrated in FIG. 1, the terminal device 10, the devices 12 and 14, and the server 16 have a function of communicating with each other via a communication path N such as a network. The terminal device 10, the devices 12 and 14, and the server 16 may communicate with another device via different communication paths, rather than using the communication path N. In the example illustrated in FIG. 1, the device system includes two devices (the devices 12 and 14). However, the device system may include three or more devices. In addition, the device system may include plural terminal devices 10 or plural servers 16. In addition, the device system may not include the server 16.

The terminal device 10 is a device such as a personal computer (PC), a tablet PC, a smart phone, or a mobile phone, and has a function of transmitting and receiving data with another device. In addition, the terminal device 10 may be a wearable terminal (for example, a wristwatch type terminal, a wristband type terminal, an eyeglass type terminal, a ring type terminal, a contact lens type terminal, an intracorporeal implanting type terminal, or a hearable terminal). The terminal device 10 functions as, for example, a user interface unit (UI unit) when the device is used.

Each of the devices 12 and 14 has a function and is, for example, an image forming device having an image forming function, a PC, a tablet PC, a smart phone, a mobile phone, a robot (for example, a humanoid robot, an animal (other than human) type robot, or another type robot), a projector, a display device such as a liquid crystal display, a recording device, a playback device, an image capturing device such as a camera, a refrigerator, a rice cooker, a microwave oven, a coffee maker, a vacuum cleaner, a washing machine, an air conditioner, a lighting device, a watch, a surveillance camera, an automobile, a motorcycle, an aircraft (for example, an unmanned aircraft (so-called, drone)), a game device, or various sensing devices (for example, a temperature sensor, a humidity sensor, a voltage sensor, or a current sensor).

Each of the devices 12 and 14 may be a device that outputs an output to a user (for example, an image forming device or a PC) or a device that outputs no output to the user (for example, a sensing device). In addition, all of plural devices executing a linkage function which will be described later may output an output to the user. Some of the devices may output an output to the user, and the other devices may not output an output to the user. All the devices may not output an output to the user. The concept of the devices 12 and 14 may include all general kinds of devices. For example, the devices according to the present exemplary embodiment may also include an information device, a video device, an audio device, and other devices. In addition, the devices 12 and 14 have a function of transmitting and receiving data with other devices.

The server 16 is a device that manages, for example, data, user information, and the devices 12 and 14. Further, the server 16 has a function of transmitting and receiving data with other devices.

In the terminal device 10, an operation assistant (a personal assistant) is used for assisting an operation by a user. For example, the operation assistant has a function of receiving a request from the user, analyzing the content of the request, creating a reply to the request, and providing the user with the reply. The operation assistant is implemented by, for example, executing a program, and the program is installed in, for example, the terminal device 10. In addition, the program for the operation assistant may be installed in an external device such as the server 16, and the function of the operation assistant may be provided from the server 16 to the terminal device 10. In addition, the operation assistant may be implemented by artificial intelligence (AI). For example, the operation assistant may have a learning function by AI and have an ability to make a determination similar to a human decision by the learning function. In addition, neural network type deep learning may be used, reinforcement learning or the like for partially reinforcing a learning field may be used, or a genetic algorithm, cluster analysis, a self-organization map, ensemble learning and others may be used. In addition, an AI related technology other than the technologies described above may be used.

By using the operation assistant, for example, the display of a function that each device has or the display of a linkage function executable by using plural functions is controlled. The process of specifying a function that each device has or a linkage function may be performed by the terminal device 10 or by an external device such as the server 16. Hereinafter, it is assumed that the specifying process is performed by the terminal device 10.

Figure 2:
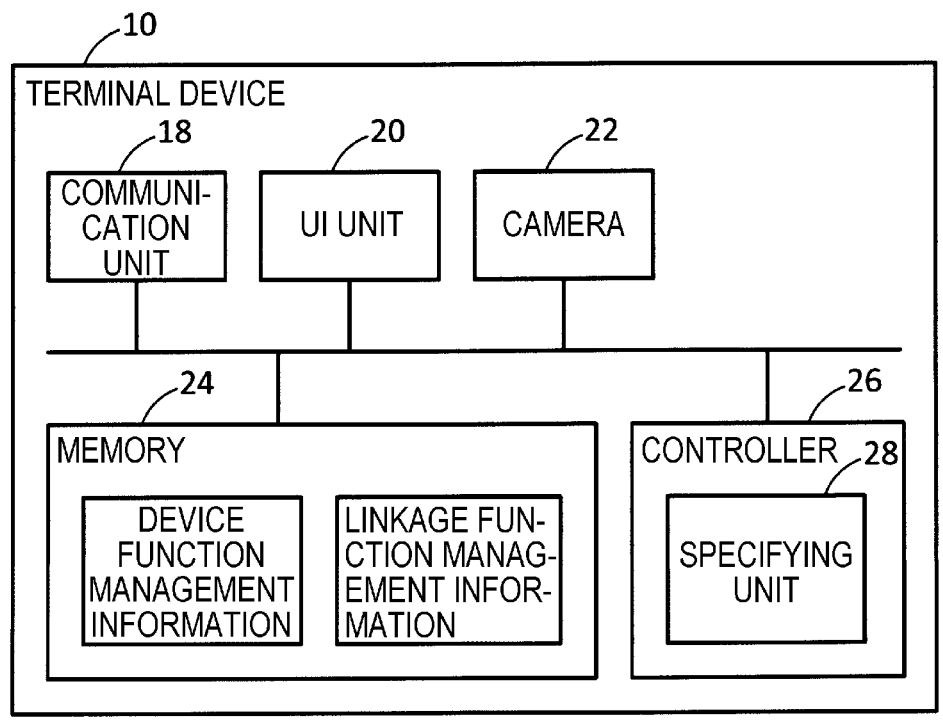
FIG. 2 is a block diagram illustrating a configuration of a terminal device.

Hereinafter, a configuration of the terminal device 10 will be described in detail with reference to FIG. 2.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi (registered trademark) communication, or a near-field wireless communication (for example, a near field communication (NFC)). As for the near-field wireless communication, for example, Felica (registered trademark), Bluetooth (registered trademark), or a radio frequency identifier (RFID) is used. Another type of a wireless communication may be used as the near-filed wireless communication. The communication unit 18 may switch a communication method or a frequency band according to, for example, a communication partner or a surrounding environment.

A UI unit 20 is a user interface unit and includes a display unit and an operation unit. The display unit is, for example, a display device such as a liquid crystal display. The operation unit is, for example, an input device such as a touch panel or a keyboard. In addition, the UI unit 20 may be a user interface serving as both the display unit and the operation unit (for example, a touch type display or a device of which display electronically displays a keyboard or the like). In addition, the UI unit 20 may include a sound collecting unit such as a microphone and a sound generating unit such as a speaker. In this case, information may be input to the terminal device 10 by a voice input or information may be output by voice.

The display unit of the UI unit 20 may display, for example, an image captured by a camera, an image associated with a device identified as a device to be used (for example, a device to be used alone or a device to be linked), and an image associated with a function. The image associated with a device may be an image (a still image or a video) representing the device captured by a camera, or an image schematically representing the device (for example, an icon). For example, the image data schematically representing the device may be created by a controller 26 of the terminal device 10, stored in advance in a memory 24 of the terminal device 10, stored in the server 16 to be provided from the server 16 to the terminal device 10, or stored in another device to be provided from the other device to the terminal device 10. The image associated with a function is, for example, an image such as an icon representing the function.

A camera 22 which is an image capturing unit generates image data (for example, still image data or video data) by capturing an object to be captured. The image is displayed on, for example, the display unit of the UI unit 20. The image displayed on the display unit may be operated by the user. In addition, image data obtained by capturing with an external camera may be transmitted to the terminal device 10 via a communication path, and the image may be displayed on the display unit of the UI unit 20. In this case as well, the image may be operated by the user.

The memory 24 is a storage device such as a hard disk or a memory (for example, an SSD). The memory 24 stores, for example, device function management information, linkage function management information, various data, various programs (for example, an operating system (OS), a program for implementing the operation assistant, and various application programs), information indicating an address of each device (device address information), information indicating an address of the server 16 (server address information), information on an identified device, information on an identified device to be linked, information on a function that an identified device has, and information on a linkage function. These pieces of information may be stored in different storage devices or in a single storage device. In addition, the program for implementing the operation assistant may be stored in an external device such as the server 16, such that the program itself may be executed by the external device, and the function of the operation assistant may be provided from the external device to the terminal device 10. In this case, the program for implementing the operation assistant may not be stored in the memory 24.

Hereinafter, the device function management information and the linkage function management information will be described.

The device function management information is information for managing the function that each device has, and indicates, for example, an association between device identification information (device identification information) for identifying a device and function information indicating the function that the device has. The device identification information is, for example, a device ID, a device name, information indicating a device type, a model number of a device, information for managing a device (for example, an asset management number), information indicating a position where a device is installed (device position information), a device image associated with a device, and address information of a device. The device image is, for example, an external appearance image representing a device. The external appearance image may be an image representing an outer side of a device (for example, a casing of a device), an image representing a state where the casing is opened such that the inside of the device is seen from the outside (for example, the internal structure), or an image representing a state where the device is covered with, for example, a packing sheet. The device image may be an image generated by capturing a device (for example, an image representing the outer side or the inside of a device) or an image emulating a device (for example, an icon). The function information is, for example, a function ID or a function name. For example, in a case where the device 12 is an image forming device and the image forming device has a printing function, a scanning function, and a copying function, the device identification information of the image forming device is associated with, for example, function information indicating the printing function, function information indicating the scanning function, and function information indicating the copying function. The function that each device has is specified (identified) by referring to the device function management information.

A device managed by the device function management information is, for example, a device included in the device system (for example, the device 12 or 14). In addition, a device which is not included in the device system may be managed by the device function management information. For example, the terminal device 10 may acquire information on a new device which is not included in the device system (including the device identification information and the function information), and newly register the information in the device function management information. The information on a device may be acquired by using, for example, the Internet or may be input by, for example, an administrator. In addition, the terminal device 10 may update the device function management information, for example, at any timing, regularly, or at a timing designated by, for example, an administrator. Thus, function information indicating the function that a device did not have before updating but the device has after updating may be registered in the device function management information. Similarly, function information indicating the function that a device did not have before updating but the device has after updating may be deleted from the device function management information or registered as unusable information. Information for the updating may be acquired by using, for example, the Internet or may be input by, for example, an administrator. In addition, the terminal device 10 itself may not acquire the information on a device to perform the generation or updating of the device function management information. An external device such as the server 16 may acquire the information on a device and perform the generation or updating of the device function management information. In this case, the device function management information generated or updated by the external device is transmitted from the external device to the terminal device 10 and stored in the memory 24.

The linkage function management information is information for managing a linkage function which is executed by linking plural functions to each other. One or plural linkage functions are executed by linking plural functions to each other. For example, the linkage function may be a function executable by linking plural functions that a single device (for example, the device 12) has to each other, or a function executable by linking plural functions that plural devices (for example, the devices 12 and 14) have to each other. In addition, the terminal device 10 that makes an operation instruction may also be used as a device to be linked, and the function that the terminal device 10 has may also be used as a portion of the linkage function.

The linkage function may be executed without using hardware devices. For example, the linkage function may be executed by linking plural pieces of software to each other. In addition, the linkage function may be executed by linking the function that a hardware device has and the function implemented by software to each other.

The linkage function management information indicates, for example, an association between a combination of pieces of function information indicating respective functions used for a linkage function and linkage function information indicating the linkage function. The linkage function information is, for example, a linkage function ID or a linkage function name. When a solo function is updated, the linkage function management information is also updated according to the updating of the solo function. Thus, a linkage function by plural functions which are unable to be linked to each other before updating may become usable after updating, or in the meantime, a linkage function which is usable before updating may become unusable after updating. The linkage function information indicating the linkage function which becomes usable after updating is registered in the linkage function management information, and the linkage function information indicating the linkage function which becomes unusable after the updating is deleted from the linkage function management information or registered as unusable information. The updating of the linkage function management information may be performed by the terminal device 10 or an external device such as the server 16. When the updating of the linkage function management information is executed by an external device, the updated linkage function management information is transmitted from the external device to the terminal device 10 and stored in the memory 24.

When plural devices are linked to each other, the linkage function management information is, for example, information for managing a linkage function using plural functions that the plural devices have, and indicates an association between a combination of pieces of device identification information for identifying the respective devices used for the linkage function and the linkage function information. In addition, when a device having plural output functions (a device having plural output functions to output an output to the user) and a sensing device which does not have the output function (a device outputting no output to the user) are linked to each other, the linkage function management information may include information indicating a combination of the specific sensing device and a specific one of the plural output functions. Accordingly, among the plural output functions, an output function to be used in combination with the specific sensing device is specified. As described above, when the device function management information is updated, the linkage function management information is also updated according to the updating of the device function management information. Thus, a linkage function by plural devices which are unable to be linked to each other before updating may become usable after updating, or in the meantime, a linkage function which is usable before updating may become unusable after updating.

The linkage function may be a function executable by linking plural different functions to each other or a function executable by linking identical functions to each other. The linkage function may be a function which is unusable before the linkage. The function which is unusable before the linkage may be a function usable by using identical functions among functions that devices to be linked have or a function usable by combining different functions with each other among functions that devices to be linked have. For example, when a device having the printing function (a printer) and a device having the scanning function (a scanner) are linked to each other, a copying function is implemented as a linkage function. That is, the copying function is implemented by linking the printing function and the scanning function to each other. In this case, the copying function which is a linkage function is associated with the combination of the printing function and the scanning function. For example, in the linkage function management information, linkage function information indicating the copying function as the linkage function is associated with the combination of device identification information for identifying the device having the printing function and device identification information for identifying the device having the scanning function.

The concept of the linkage function may include a coalescing function which executes a new function by linking plural functions or plural devices to each other. For example, an extended displaying function as a coalescing function may be implemented by combining plural displays. As another example, a recording function as a coalescing function may be implemented by combining a television and a recorder. The video recording function may be a function of recording an image displayed on the television. In addition, an image capturing area extension function as a coalescing function may be implemented by combining plural cameras. The extension function is, for example, a function of capturing an image by linking the capturing areas of the respective cameras to each other. In addition, a translated call function (a function of translating a conversation via a telephone) as a coalescing function may be implemented by combining a telephone with a translator or translation software. As described above, the concept of the linkage function includes a function which may be implemented by linking identical types of devices or functions to each other, and a function which may be implemented by linking different types of devices or functions to each other.

The controller 26 controls the operation of each unit of the terminal device 10. The controller 26 performs, for example, the control of a communication by the communication unit 18 and a control of information display on the display unit of the UI unit 20. Further, the controller 26 includes a specifying unit 28.

The specifying unit 28 has a function of specifying a function that a device designated by the user has or a linkage function executable by using plural devices designated by the user. The specifying unit 28 is implemented by, for example, the operation assistant. In addition, the specifying unit 28 may be implemented by, for example, another program rather than the operation assistant.

For example, the specifying unit 28 receives device identification information for identifying a device designated by the user, and specifies function information indicating a function associated with the device identification information in the device function management information stored in the memory 24. Accordingly, the function that the device has is specified (identified).

The controller 26 controls a notification (guidance) of the information on the function specified by the specifying unit 28 (for example, function information or function explanation information). As for the notification, the controller 26 may display the information on the function on the display unit of the UI unit 20 or issue the information on the function as voice information by using, for example, a speaker. In addition, the controller 26 may control execution of the function. In addition, the designation of a device by the user may be performed on the screen of the display unit of the UI unit 20 or may be performed by voice. For example, when an image associated with a device is displayed on the screen of the UI unit 20, the user may designate the device by designating the image on the screen. As another example, the user may designate a device by voice, regardless of whether an image associated with the device is displayed on the screen of the UI unit 20. For example, when the user utters a device name by voice, the voice is collected by the sound collecting unit such as a microphone, and voice information indicating the device name is input to the terminal device 10. The specifying unit 28 determines that the device having the device name is designated by the user, and specifies the function of the device. As described above, the operation to designate a device and the notification of a function may be performed either by a display on the screen or by voice. The display on the screen and the voice may be combined with each other. For example, the user may designate an image associated with a device on the screen so as to designate the device, and information indicating the function of the device may be displayed on the screen. As another example, a device may be designated in the manner that the user designates an image associated with the device on the screen, and information indicating the function of the device may be output by voice. As further another example, a device may be designated in the manner that a device name is input as voice information to the terminal device 10, and information indicating the function of the device may be displayed on the screen. As still further another example, a device may be designated in the manner that a device name is input as voice information to the terminal device 10, and information indicating the function of the device may be output by voice.

In addition, the process of specifying a function may be performed by the server 16. In this case, device identification information is transmitted from the terminal device 10 to the server 16, and function information indicating a function associated with the device identification information is specified by the specifying unit 28 provided in the server 16. In addition, when the specifying process is performed by the server 16, the server 16 stores the device function management information. The information on the function is transmitted from the server 16 to the terminal device 10, and may be displayed on the display unit of the UI unit 20 or output as voice information.

In addition, the specifying unit 28 receives pieces of device identification information for identifying respective devices to be linked, and specifies linkage function information indicating a linkage function associated with a combination of the pieces of the device identification information in the linkage function management information stored in the memory 24. Accordingly, the linkage function executable by linking the functions that the respective devices to be linked have with each other is specified (identified). The controller 26 controls a notification (guidance) of the information on the specified linkage function (for example, linkage function information or linkage function explanation information). The controller 26 may display the information on the linkage function on the display unit of the UI unit 20 or issues the information of the linkage function as voice information. In addition, as described above, the designation of the respective devices to be linked may be performed on the screen or by voice.

In addition, the process of specifying a linkage function may be performed by the server 16. In this case, plural pieces of device identification information are transmitted from the terminal device 10 to the server 16, and linkage function information indicating a linkage function associated with the plural pieces of device identification information is specified by the specifying unit 28 provided in the server 16. In addition, when the specifying process is performed by the server 16, the server 16 stores the linkage function management information. The information on the linkage function is transmitted from the server 16 to the terminal device 10, and may be displayed on the display unit of the UI unit 20 or output as voice information.

For example, when a single device is designated, a function that the device has is specified, and when plural devices are designated, a linkage function executable by using the plural devices is specified.

In addition, the specifying unit 28 may receive pieces of function information indicating respective functions used for a linkage function, and specify linkage function information indicating a linkage function associated with a combination of the pieces of the function information in the linkage function management information. Accordingly, the linkage function executable by linking the respective functions to be linked to each other is specified (identified). The specifying process may also be performed by the server 16, and the process result may be displayed on the display unit of the UI unit 20 or output as voice information.

In addition, a function usable by the user (a solo function that a device has or a linkage function) may be managed for each user. This management may be performed by the terminal device 10 or an external device such as the server 16. The function usable by the user is, for example, a function provided to the user for free or a function provided to the user for a charge and purchased by the user. Usable function information indicating a function usable by the user (for example, function purchase history information) may be created and managed for each user. When the management of the usable function is performed by the terminal device 10, the usable function information is stored in the memory 24, and when the management is performed by an external device such as the server 16, the usable function information is stored in the external device. In addition, since the usable function also includes, for example, a function usable for free, an additional updating function, and a function specifically managed by an administrator, the usable function may not be determined simply according to the purchase of a function or not. A process of purchasing a function is performed by an external device such as the server 16.

The usable function management information is information for managing a function usable by each user, and indicates, for example, an association between user identification information for identifying a user and function information (which may include linkage function information) indicating a function usable by the user. As described above, the function usable by the user is, for example, a function provided to the user for free or a function purchased by the user, and may be a solo function or a linkage function. The user identification information is, for example, user account information such as a user ID or a name of the user. A function usable by each user is specified (identified) by referring to the usable function management information. The usable function management information may be updated, for example, each time a function is provided to the user (for example, each time a function is provided to the user for free or for a charge).

When the function usable by the user is managed, the specifying unit 28 may receive the user identification information for identifying the user and specify function information indicating each function associated with the user identification information in the usable function management information (for example, the information stored in the terminal device 10 or the server 16). Accordingly, the function usable by the user is specified (identified). The controller 26 may display the information on the specified function on the display unit of the UI unit 20 or issue the information of the specified function as voice information. For example, the specifying unit 28 receives device identification information and user identification information. Then, the specifying unit 28 specifies function information indicating a function associated with the device identification information in the device function management information, and specifies function information indicating a function associated with the user identification information in the usable function management information. Accordingly, the function usable by the user that is specified by the user identification information is specified as the function that the device specified by the device identification information has.

In addition, the function usable by the user may be specified by an external device such as the server 16. In this case, the user identification information is transmitted from the terminal device 10 to the server 16, and function information indicating each function associated with the user identification information is specified by the specifying unit 28 provided in the server 16. When the specifying process is performed by the server 16, the server 16 stores the usable function management information. The information on each function usable by the user is transmitted from the server 16 to the terminal device 10, and may be displayed on the display unit of the UI unit 20 or output as voice information.

Figure 3:
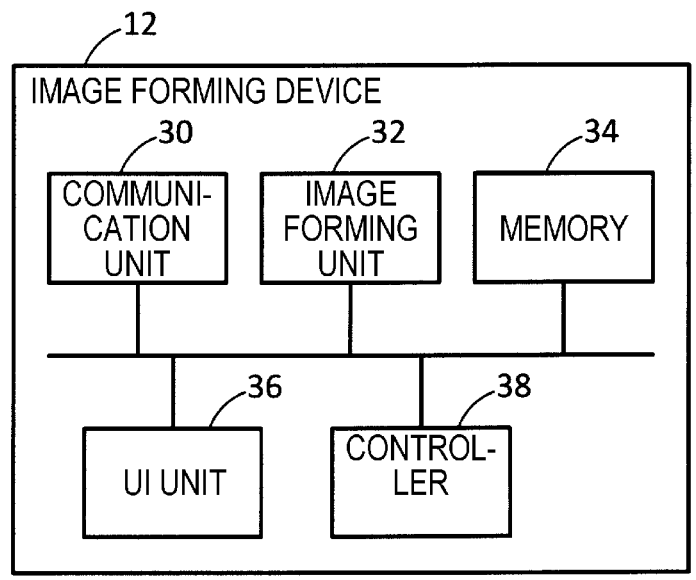
FIG. 3 is a block diagram illustrating a configuration of an image forming device.

Hereinafter, a configuration of the device 12 will be described in detail with reference to FIG. 3. For example, it is assumed that the device 12 is an image forming device. Hereinafter, the device 12 may be referred to as an image forming device 12. FIG. 3 illustrates a configuration of the image forming device 12.

A communication unit 30 is a communication interface and has a function of transmitting data to another device and a function of receiving data from another device. The communication unit 30 may be a communication interface having a wireless communication function or a communication interface having a wired communication function. For example, the communication unit 30 is compatible with one type or plural types of communication methods and may communicate with a communication partner according to a communication method suitable for the communication partner (that is, a communication method with which the communication partner is compatible). The communication method is, for example, an infrared communication, a visible light communication, a Wi-Fi communication, or a near-field wireless communication. For example, the communication unit 30 may switch a communication method or a frequency band according to a communication partner or a surrounding environment.

An image forming unit 32 has an image forming function. Specifically, the image forming unit 32 has at least one of a scanning function, a printing function, a copying function, or a faxing function. When the scanning function is executed, a document is read, and scanned data (image data) is generated. When the printing function is executed, an image is printed on a recording medium such as a paper. When the copying function is executed, a document is read and printed on a recording medium. When the faxing function is executed, image data is transmitted or received by facsimile. In addition, a linkage function using plural functions may be executed. For example, a scanning transmitting function which is a combination of a scanning function and a transmitting function may be executed. When the scanning transmitting function is executed, a document is read so that scanned data (image data) is generated, and transmitted to a transmission destination (for example, an external device such as the terminal device 10). In addition, the linkage function is merely an example, and another linkage function may be executed.

A memory 34 is a storage device such as a hard disk or a memory (for example, an SSD). The memory 34 stores, for example, information indicating an instruction of image formation (for example, job information), image data to be printed, scanned data which is generated by executing the scanning function, device address information indicating an address of another device, information indicating an address of the terminal device 10 (terminal address information), server address information of the server 16, various control data, and various programs. These pieces of information may be stored in different storage devices or in a single storage device.

A UI unit 36 is a user interface unit including a display unit and an operation unit. The display unit is, for example, a display device such as a liquid crystal display. The operation unit is, for example, an input device such as a touch panel or a keyboard. In addition, the UI unit 20 may be a user interface serving as both the display unit and the operation unit (for example, a touch type display or a device of which display electronically displays a keyboard or the like). In addition, the image forming device 12 may not include the UI unit 36, and may include a hardware user interface unit (a hardware UI unit) having no display unit. The hardware UI unit is, for example, a hardware key specialized in input of numerals (for example, a numeric keypad) or a hardware key specialized in indication of directions (for example, direction indication keys).

A controller 38 controls the operation of each unit of the image forming device 12.

Figure 4:
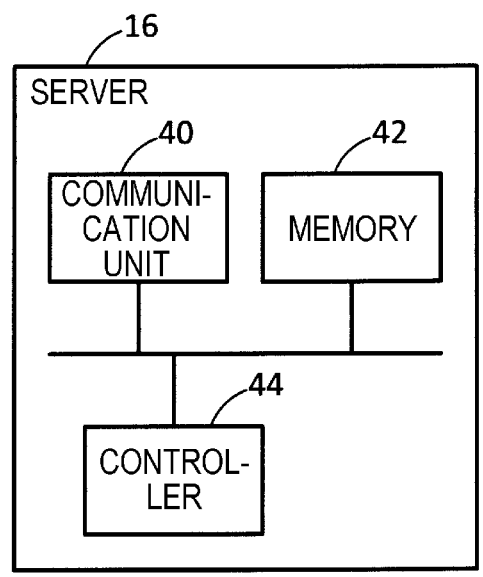
FIG. 4 is a block diagram illustrating a configuration of a server.

Hereinafter, a configuration of the server 16 will be described in detail with reference to FIG. 4. FIG. 4 illustrates a configuration of the server 16.

A communication unit 40 is a communication interface and has a function of transmitting data to another device and a function of receiving data from another device. The communication unit 40 may be a communication interface having a wireless communication function or a communication interface having a wired communication function.

A memory 42 is a storage device such as a hard disk or a memory (for example, an SSD). The memory 42 stores, for example, various data, various programs, address information of the terminal device 10, address information of each device, and server address information of the server 16. These pieces of information may be stored in different storage devices or in a single storage device.

When the function that each device has and the linkage function are managed by the server 16, the above-described device function management information and linkage function management information are stored in the memory 42, such that the device function management information and the linkage function management information may be updated in the server 16. When a process of specifying the function is performed by the terminal device 10, the device function management information and the linkage function management information (the updated information when the information is updated) are transmitted from the server 16 to the terminal device 10. The transmission may be performed periodically or at a designated timing. Accordingly, the information stored in the terminal device 10 is updated. In addition, the specifying unit 28 of the terminal device 10 may specify the function that each device has or linkage function by referring to the device function management information and the linkage function management information that are stored in the server 16. In addition, the process of specifying the function may be executed by the server 16.

A controller 44 controls the operation of each unit of the server 16. The controller 44 controls, for example, the communication by the communication unit 40.

The controller 44 may execute the process of purchasing a function and manage the history of the purchase. For example, when the user purchases a paid function, the controller 44 may apply a charging process to the user.

In addition, the controller 44 may execute the functions related to image processing such as a character recognition function, a translation function, an image processing function, and an image forming function. In addition, the controller 44 may execute the function related to a process other than the image processing. When the character recognition function is executed, characters in an image are recognized, and character data indicating the characters is generated. When the translation function is executed, characters in an image are translated into characters expressed in a specific language, and character data indicating the translated characters is generated. When the image processing function is executed, an image is processed. For example, the controller 44 may receive scanned data that has been generated by executing the scanning function from the image forming device 12, and execute the function related to the image processing such as the character recognition function, the translation function, or the image processing function, for the scanned data. The controller 44 may receive image data from the terminal device 10 and execute each function for the image data. For example, the character data or the image data generated by the controller 44 is transmitted from the server 16 to the terminal device 10. The server 16 may be used as an external device, and a linkage function may use functions that plural devices including the server 16 have.

As described above, the device function management information may be stored in the memory 42 of the server 16. In this case, the device function management information may not be stored in the memory 24 of the terminal device 10. Similarly, the linkage function management information may be stored in the memory 42 of the server 16. In this case, the linkage function management information may not be stored in the memory 24 of the terminal device 10. The controller 44 of the server 16 includes the specifying unit 28 described above, and may specify the function that a device has or a linkage function executable by using plural functions, by identifying a device based on the device identification information. In this case, the terminal device 10 may not include the specifying unit 28.

When the usable function management information is created, the usable function management information may be stored in the memory 42 of the server 16. In this case, the usable function management information may not be stored in the memory 24 of the terminal device 10. The controller 26 of the terminal device 10 may manage the history of purchase of a function by the user. In this case, the controller 44 of the server 16 may not have the function of managing the history.

As another example, a device such as the device 12 or 14 may store the device function management information or the linkage function management information, or the device such as the device 12 or 14 may include the specifying unit 28. That is, the process by the specifying unit 28 may be performed by the terminal device 10, a device such as the device 12 or 14, the server 16, or another device.

In the first exemplary embodiment, the device identification information is acquired by applying, for example, the augmented reality (AR) technique so that a device is identified. For example, by applying the AR technique, device identification information of a device used alone is acquired so that the device is identified, and device identification information of devices to be linked is acquired so that the devices to be linked are identified. A known AR technique may be used as the AR technique. For example, a marker AR technique using a marker such as a two-dimensional barcode, a markerless AR technique using an image recognition technique, or a position information AR technique using position information is used. In addition, the device identification information may be acquired without using the AR technique so that a device is identified. For example, when a device is connected to a network, the device may be identified based on an IP address, or device ID may be read so that the device may be identified. In addition, when a device or a terminal device having various wireless communication functions such as an infrared communication, a visible light communication, Wi-Fi, and Bluetooth is used, device ID may be acquired by using the wireless communication functions so that the device is identified.

Figures 5, 6:
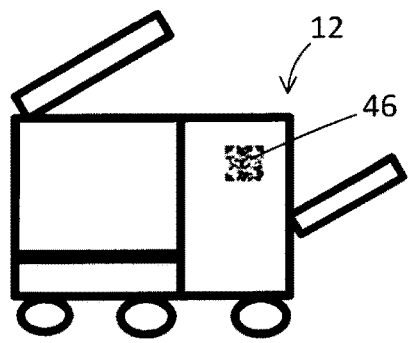
FIG. 5 is a schematic view illustrating the external appearance of the image forming device.
FIG. 6 is a view illustrating a device function management table.

Hereinafter, the process of acquiring device identification information will be described in detail with reference to FIG. 5. As an example, a case where device identification information of the image forming device 12 is acquired will be described. FIG. 5 schematically illustrates the external appearance of the image forming device 12. Here, the process of acquiring device identification information by applying the marker AR technique will be described. A marker 46 such as a two-dimensional barcode is provided on a casing of the image forming device 12. The marker 46 is information obtained by encoding device identification information of the image forming device 12. The user activates the camera 22 of the terminal device 10 and captures the marker 46 provided on the image forming device 12 to be used, using the camera 22. Accordingly, image data representing the marker 46 is generated. The controller 26 of the terminal device 10 extracts the device identification information by applying a decoding process to the marker image represented in the image data. Accordingly, the image forming device 12 to be used (the image forming device 12 having the captured marker 46) is identified. The specifying unit 28 of the terminal device 10 specifies function information indicating a function associated with the extracted device identification information, in the device function management information. Accordingly, the function that the image forming device 12 to be used has is specified (identified).

In addition, the controller 44 of the server 16 may extract the device identification information by applying the decoding process to the image data representing the marker 46. In this case, the image data is transmitted from the terminal device 10 to the server 16, and the decoding process is applied to the image data in the server 16. When the server 16 is provided with the specifying unit 28, the function associated with the device identification information may be specified in the server 16.

The function information indicating the function that the image forming device 12 has may be encoded and included in the marker 46. In this case, when the decoding process is applied to the image data representing the marker 46, the device identification information of the image forming device 12 is extracted, and the function information indicating the function that the image forming device 12 has is also extracted. Accordingly, the image forming device 12 is specified (identified), and the function that the image forming device 12 has is specified (identified). The decoding process may be performed by the terminal device 10 or the server 16.

In a case of executing a linkage function using functions that plural devices have, device identification information of each device is acquired by capturing a marker of each device to be linked, so that the linkage function is specified (identified).

For example, when device identification information is acquired by applying the markerless AR technique, the user captures the entire external appearance or a portion of the external appearance of a device to be used (for example, the image forming device 12), with the camera 22 of the terminal device 10. In order to acquire information for specifying a device to be used such as a name (for example, a product name), a model number, or an asset management number, it is helpful to capture the external appearance of the device. By the capturing, external appearance image data representing the entire external appearance or a portion of the external appearance of the device to be used is generated. The controller 26 of the terminal device 10 identifies the device to be used based on the external appearance image data. For example, the memory 24 of the terminal device 10 stores external appearance image association information, for each device, indicating an association between external appearance image data representing the entire external appearance or a portion of the external appearance of the device and device identification information of the device. For example, the controller 26 compares the external appearance image data with each external appearance image data included in the external appearance image association information, and specifies the device identification information of the device to be used based on the comparison result. For example, the controller 26 extracts an external appearance feature of the device to be used from the acquired external appearance image data, specifies external appearance image data representing the same or similar external appearance feature as or to the extracted external appearance feature, in the external appearance image data group included in the external appearance image association information, and specifies device identification information associated with the external appearance image data. Accordingly, the device to be used (the device captured by the camera 22) is identified. As another example, when external appearance image data representing a name (for example, a product name) or a model number of the device to be used is generated by capturing the name or the model name, the device to be used may be identified based on the name or the model number represented in the external appearance image data. The specifying unit 28 of the terminal device 10 specifies function information indicating each function associated with the specified device identification information, in the device function management information. Accordingly, the function that the device to be used (for example, the image forming device 12) has is specified.

In addition, the controller 44 of the server 16 may compare the external appearance image data representing the entire external appearance or a portion of the external appearance of the device to be used (for example, the image forming device 12) with each appearance image data included in the external appearance image association information, and specify the device identification information of the device to be used based on the comparison result. The external appearance image association information is stored in the memory 42 of the server 16. In this case, the controller 44 of the server 16 specifies the device identification information of the device to be used, by referring to the external appearance image association information.

In a case of executing a linkage function using plural functions that plural devices have, device identification information of each device to be linked is acquired by capturing the entirety or a part of the external appearance of each device to be linked, so that the linkage function is specified (identified).

When device identification information is acquired by applying the position information AR technique, position information indicating a position where a device (for example, the image forming device 12) is installed is acquired by using, for example, a global positioning system (GPS) function. For example, each device has the GPS function and acquires device position information indicating a position of the own device. The terminal device 10 outputs information indicating a request for acquiring device position information to a device to be used, and receives the device position information of the device from the device as a response to the acquisition request. The controller 26 of the terminal device 10 identifies the device to be used based on the device position information. For example, the memory 24 of the terminal device 10 stores position association information, for each device, indicating an association between device position information indicating a position where a device is provided and device identification information of the device. The controller 26 specifies device identification information associated with the device position information in the position association information. Accordingly, the device to be used is specified (identified). The specifying unit 28 of the terminal device 10 specifies function information indicating each function associated with the specified device identification information, in the device function management information. As a result, the function that the device to be used (for example, the image forming device 12) has is specified (identified).

In addition, the controller 44 of the server 16 may specify the device identification information associated with the position information of the device to be used in the position association information. The position association information is stored in the memory 42 of the server 16. In this case, the controller 44 of the server 16 specifies the device identification information of the device to be used, by referring to the position association information.

In a case of executing a linkage function using plural devices, device position information of each device to be linked is acquired, and device identification information of each device is specified based on the device position information of each device. Thus, the linkage function is specified (identified).

In addition, a device may be identified by using plural identification techniques. For example, a device may be identified by using plural techniques selected from the marker AR technique, the markerless AR technique, and the position information AR technique. In addition, when a device is not identified by a certain identification technique, the device may be identified by using another identification technique. For example, when a device is not identified by the marker AR technique or the markerless AR technique, the device may be identified by using the position information AR technique.

Hereinafter, the device system according to the first exemplary embodiment will be described in more detail.

The device function management information will be described in detail with reference to FIG. 6. FIG. 6 illustrates an example of a device function management table which is the device function management information. In the device function management table, for example, a device ID, information indicating a device name (for example, a device type), information indicating a function that a device has (function information), and an image ID are associated with each other. The device ID and the device name correspond to an example of the device identification information. The image ID is an example of image identification information for identifying a device image associated with a device. In addition, the device function management table may not include the image ID. For example, a device with the device ID "B" is a multifunction machine (an image forming device having plural image forming functions), and has functions such as the printing function and the scanning function. The device is associated with an image ID for identifying a device image associated with the device. For example, data of a device image associated with a device may be stored in the terminal device 10, the server 16, or another device.

For example, a device ID for identifying a device to be used is acquired by applying the AR technique. The specifying unit 28 of the terminal device 10 specifies the device name, the function, and the image ID which are associated with the device ID, by referring to the device function management table. Accordingly, the device to be used is identified. The information indicating the device name or the device image is displayed on the display unit of the UI unit 20. In addition, an image itself captured by the camera 22 may be displayed on the display unit of the UI unit 20. In addition, when a device image associated with the device (for example, an image captured by the camera 22 or an image schematically representing the device) is designated by the user in the UI unit 20, information on a function that the device has (for example, function information or function explanation information) may be displayed on the display unit of the UI unit 20.

Figures 7, 8:
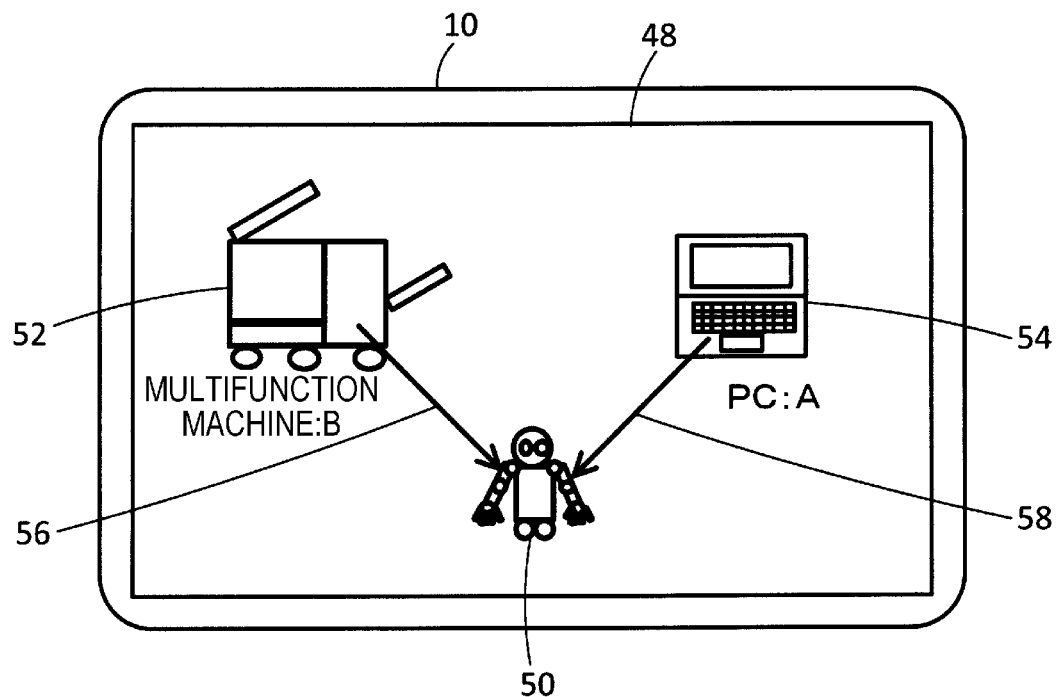
FIG. 7 is a view illustrating a linkage function management table.
FIG. 8 is a view illustrating a screen.

Hereinafter, the linkage function management information will be described in detail with reference to FIG. 7. FIG. 7 illustrates an example of a linkage function management table which is the linkage function management information. In the linkage function management table, for example, a combination of device IDs, information indicating a device name of each device to be linked (for example, types of respective devices), and information indicating a linkage function (linkage function information) are associated with each other. For example, a device with the device ID "A" is a personal computer (PC), and a device with the device ID "B" is a multifunction machine. When the PC A and the multifunction machine B are linked to each other, for example, the "scanning transmitting function" or the "printing function" is implemented as a linkage function. The "scanning transmitting function" is a function of transmitting image data generated by scanning by the multifunction machine B to the PC A. The "printing function" is a function of transmitting data (for example, image data or document data) saved in the PC A to the multifunction machine B and print the data by the multifunction machine B. In addition, a linkage function executable by using three or more devices may be set. In this case, a combination of the three or more devices and a linkage function are associated with each other, and the association is registered in the linkage function management table.

Hereinafter, the operation of the terminal device 10 will be described in detail by using specific examples.

FIG. 8 illustrates an example of a screen which is displayed on the terminal device 10. The controller 26 of the terminal device 10 displays a screen 48 on the display unit of the UI unit 20 to and displays various pieces of information of the screen 48. For example, the screen 48 displays an assistant image 50 associated with the operation assistant.

The operation assistant has a function of making a conversation with the user by AI. For example, when the user inputs information in the form of a character input or a voice input through the UI unit 20, the operation assistant analyzes the information and outputs the analysis result. The analysis result may be displayed as a character string or an image on the UI unit 20 or may be output by voice. For example, when the user makes a request by using the UI unit 20, the operation assistant analyzes the content of the request and outputs a reply as the analysis result. The operation assistant may search information using the Internet or the like and analyze the results of the search, or may acquire information on the devices 12 and 14 and analyze the information. The analysis result may be reflected on the reply to the request from the user. In addition, the operation assistant may manage, for example, the history of use of various applications by the user, the history of an operation of the terminal device 10 by the user, and the history of use of the devices 12 and 14 by the user. In addition, the operation assistant may acquire information from an operation assistant stored in another device by communicating with the operation assistant of the other device.

Further, the screen 48 displays device images 52 and 54. The device image 52 is an image associated with a multifunction machine B (an image forming apparatus) which is a device, and the device image 54 is an image associated with a PC A which is a device. The PC A and the multifunction machine B are devices identified by the specifying unit 28 by using the AR technique described above (the marker AR technique, the markerless AR technique, or the position information AR technique) or another identification technique. When the devices are identified as described above, the controller 26 displays the images associated with the devices to be displayed on the screen 48. For example, the information on the already identified devices is stored in the memory 24, and the images associated with the devices are displayed on the screen 48 later even when the process of identifying the devices is not performed again. In addition, the information on the identified devices may be deleted from the memory 24 through an operation by the user. In this case, the images associated with the devices are also deleted. As another example, the information on the identified devices may be deleted from the memory 24 after a linkage function is executed by using the identified devices or after a predetermined time elapses from the time when the devices are identified.

The device image 52 may be an image generated by capturing the multifunction machine B by the camera 22 (an image having a size at the capturing time or an enlarged or reduced image), or a schematic image (for example, an icon) associated with the multifunction machine B. Similarly, the device image 54 may also be an image generated by capturing the PC A or a schematic image associated with the PC A.

In addition, when image data generated by capturing a device is used, the image reflects the current external appearance of the device itself (for example, the external appearance reflecting a scratch, a memo, and a seal adhered to a device), and thus, there is an effect in that the user may visually confirm the difference from a similar type of other devices.

When a schematic image is used, the specifying unit 28 specifies the schematic image associated with the identified device by referring to the device function management table illustrated in FIG. 6. The schematic images are displayed as the device images 52 and 54 on the screen 48. The data of the schematic image may be stored in the terminal device 10 or an external device such as the server 16.

In addition, when a device is identified, information indicating the name of the device may be displayed on the screen 48. In the example illustrated in FIG. 8, the character strings "Multifunction Machine B" and "PC A" are displayed as the names of the devices.

When the user transmits information of plural devices to the operation assistant, the specifying unit 28 specifies linkage functions associated with the plural devices in the linkage function management table illustrated in FIG. 7. The controller 26 causes the UI unit 20 to display the information on the linkage functions.

For example, when the user connects the device image 52 to the assistant image 50 as indicated by an arrow 56, and further, connects the device image 54 to the assistant image 50 as indicated by an arrow 58 on the screen 48, the specifying unit 28 (the specifying unit 28 implemented by the operation assistant) identifies the multifunction machine B associated with the device image 52 and the PC A associated with the device image 54 as devices to be linked. In addition, the device image 52 may be first connected to the assistant image 50, and then, the device image 54 may be connected to the assistant image 50, or the device image 54 may be first connected to the assistant image 50, and then, the device image 52 may be connected to the assistant image 50.

For example, the user connects an image (each of the device images 52 and 54 in the example described above) to another image (the assistant image 50 in the example described above) by dragging the image to the other image (for example, by touching and dragging an image) with a pointer (for example, the user's finger, a pen, or a stylus) on the screen 48. The controller 26 detects the movement of the pointer on the screen 48 by detecting the contact of the pointer with the screen 48.

As described above, when the device images 52 and 54 are connected to the assistant image 50 so that the multifunction machine B and the PC A are identified as devices to be linked, the specifying unit 28 specifies linkage functions (for example, the "scanning transmitting function" and the "printing function") associated with the combination of the PC A and the multifunction machine B in the linkage function management table illustrated in FIG. 7. Accordingly, the linkage functions executable by using the PC A and the multifunction machine B are specified. The "scanning transmitting function" is a function of transmitting image data generated by scanning by the multifunction machine B, to the PC A. The "printing function" is a function of transmitting image data stored in the PC A to the multifunction machine B and print the image data by the multifunction machine B. The information on the linkage functions specified as described above is displayed on the UI unit 20.

In addition, the process of specifying the devices or the linkage functions may be performed by the server 16.

Figure 9:
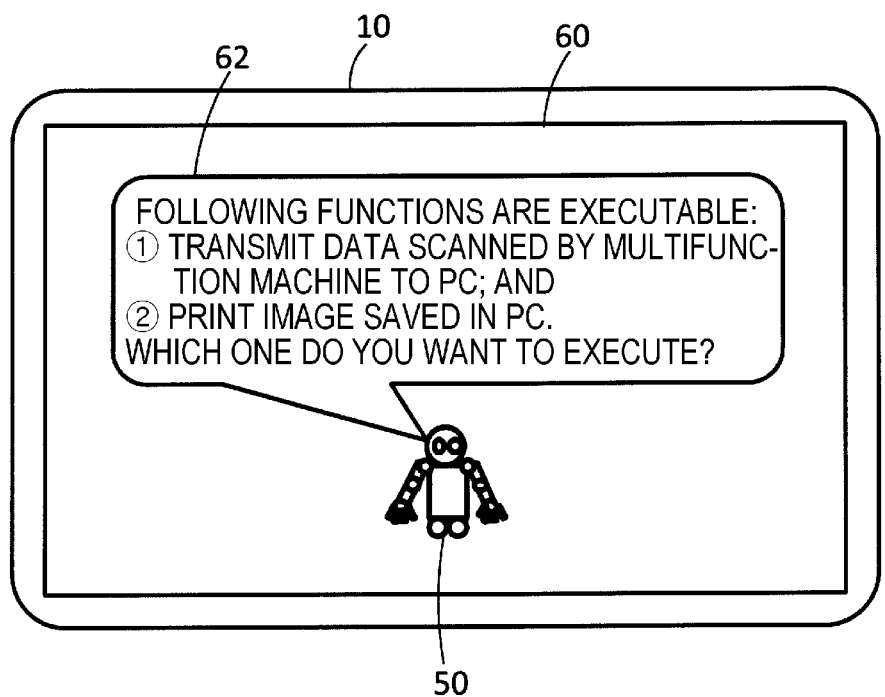
FIG. 9 is a view illustrating a screen.

When the linkage functions are specified as described above, the controller 26 of the terminal device 10 causes the UI unit 20 to display a screen 60 and displays the information on the linkage functions on the screen 60, as illustrated in FIG. 9. In order to display as if the operation assistant states the information on the linkage functions, the controller 26 may display an image 62 representing a shape of a talking bubble connected to the assistant image 50, on the screen 60. The information on the linkage functions is displayed in the image 62.

For example, when the user designates a linkage function to be executed and gives an instruction to execute the linkage function to the operation assistant on the screen 60, the operation assistant receives the execution instruction and transmits information indicating the execution instruction (execution instruction information) to the devices to be linked. The user gives the execution instruction to the operation assistant in the form of a character input or a voice input. As another example, the screen 60 may display a button image for instructing execution of a linkage function, and the user may press the button image to give an instruction to execute the linkage function. When the PC A and the multifunction machine B are selected as devices to be linked, the execution instruction information is transmitted to the PC A and the multifunction machine B. Upon receiving the execution instruction information, the PC A and the multifunction machine B execute the linkage function indicated in the execution instruction information (the linkage function designated by the user). For example, when an instruction to execute the "printing function" as a linkage function is given, the PC A transmits image data to be printed to the multifunction machine B, and the multifunction machine B prints the image data on a paper which is a recording medium.

In addition, when respective devices to be linked are identified by the marker AR technique or the markerless AR technique, the devices may be individually captured and identified, or may be captured all together and identified. For example, the multifunction machine B is captured in a state where the multifunction machine B is included in the capturing area of the camera 22, and then, the PC A is captured in a state where the PC A is included in the capturing area of the camera 22, so that the multifunction machine B and the PC A are sequentially identified. The respective devices to be linked may not be arranged near to each other, and thus, the multifunction machine B and the PC A may not be included together in the capturing area of the camera 22. This circumstance may be coped with by, for example, changing the angle of the capturing area, or enlarging or reducing the capturing area. However, this operation may not cope with the circumstance. In this case, the respective devices are identified by capturing the devices plural times.

As another example, a device to be linked may be preset as a basic linkage device. For example, it is assumed that the multifunction machine B is preset as a basic linkage device. The device identification information of the basic linkage device may be stored in advance in the memory 24 of the terminal device 10. The user may designate the basic linkage device by using the UI unit 20. When a basic linkage device is set, the user connects an image associated with a device to be linked, other than the basic device, to the assistant image. Accordingly, the device to be linked is specified (identified), and a linkage function executable by using the basic linkage device and the specified device is specified (identified).

Figure 10:
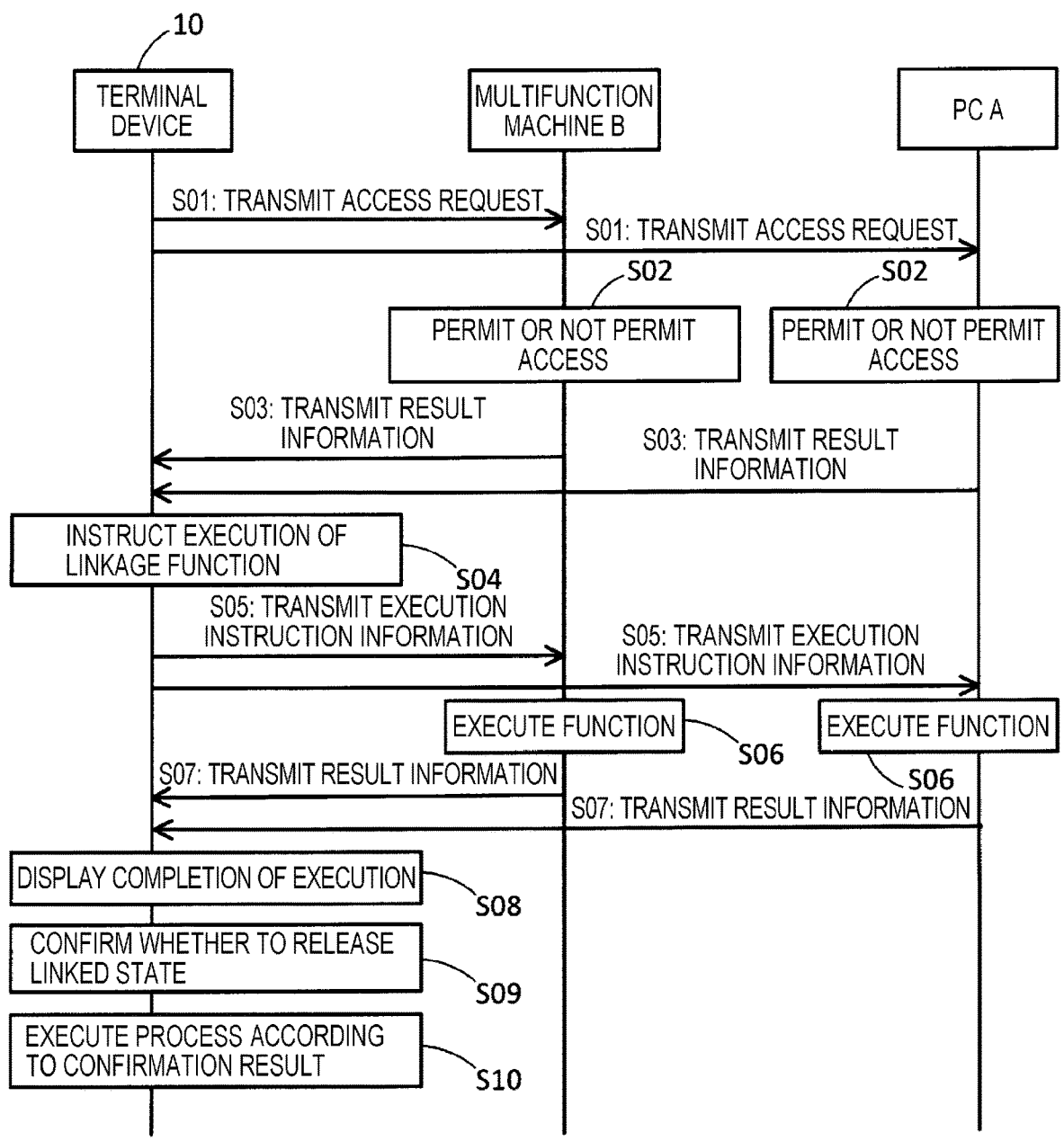
FIG. 10 is a sequence diagram illustrating an operation of the device system.

Hereinafter, operations when a linkage function is executed will be described. For example, when a linkage function is executed, an access request is transmitted from the terminal device 10 to each of the devices to be linked, and the terminal device 10 is connected to each of the devices. Hereinafter, the access process will be described with reference to FIG. 10. FIG. 10 is a sequence diagram illustrating the process.

In the terminal device 10, when the user designates the multifunction machine B and the PC A as devices to be linked (that is, when an image associated with the multifunction machine B and an image associated with the PC A are transmitted to the operation assistant), the terminal device 10 transmits information indicating an access request to the devices to be linked (the multifunction machine B and the PC A) (S01). The control of the transmission may be performed by the operation assistant. For example, when address information of each of the devices to be linked is stored in the server 16, the terminal device 10 acquires the address information of each of the devices from the server 16. When the device identification information of each of the devices includes the address information, the controller 26 of the terminal device 10 acquires the address information from the device identification information. The process of acquiring the address information may be performed by the operation assistant. In addition, the address information of each of the devices may be stored in the memory 24 of the terminal device 10. The terminal device 10 may acquire the address information of each of the devices by another method. The terminal device 10 transmits the information indicating the access request to each of the devices to be linked (for example, the multifunction machine B and the PC A), by using the address information of each of the devices to be linked.

Upon receiving the information indicating the access request, the multifunction machine B and the PC A determine whether or not to permit the access to the terminal device 10 (S02). For example, when the multifunction machine B and the PC A correspond to devices to which access is not permitted, or when the number of devices requesting an access exceeds an upper limit, the access is not permitted. In addition, when the access from the terminal device 10 is permitted, the terminal device 10 may be prohibited from performing an operation to change the unique setting information of each of the multifunction machine B and the PC A. For example, it may be prohibited to change color parameters of the multifunction machine B or setting time for shifting to power saving. Thus, the security of the devices to be linked is improved. As another example, when the devices are linked to each other, the change of the setting information may be restrictively performed, as compared with a case where each device is used alone. For example, it may be permitted to change a smaller number of setting items, as compared with a case where a device is used alone. In addition, it may be prohibited to refer to personal information of another user such as the operation history. Accordingly, the security of the personal information of the user is improved.

Result information indicating a permission or non-permission of the access is transmitted from the multifunction machine B and the PC A to the terminal device 10 (S03). When the access to the multifunction machine B and the PC A is permitted, a communication between the terminal device 10 and the multifunction machine B is established, and further, a communication between the terminal device 10 and the PC A is established.

Next, in the terminal device 10, the user instructs an execution of a linkage function (for example, the "printing function") (S04). According to the instruction, the terminal device 10 transmits information indicating the instruction to execute the linkage function (execution instruction information) to each of the devices to be linked (for example, the multifunction machine B and the PC A) (S05). The control of the transmission may be performed by the operation assistant. The execution instruction information transmitted to the multifunction machine B includes information indicating a process to be executed by the multifunction machine B (for example, job information), and the execution instruction information transmitted to the PC A includes information indicating a process to be executed by the PC A (for example, job information).

Upon receiving the execution instruction information, the multifunction machine B and the PC A execute the linkage function (for example, the "printing function") according to the execution instruction information (S06). When the linkage function to be executed includes a process of transmitting and receiving data between the multifunction machine B and the PC A, a communication between the multifunction machine B and the PC A is established. For example, the execution instruction information transmitted to the multifunction machine B includes the address information of the PC A, and the execution instruction information transmitted to the PC A includes the address information of the multifunction machine B. The communication between the multifunction machine B and the PC A is established by using the address information. When the communication is established, the PC A transmits image data to be printed to the multifunction machine B, and the multifunction machine B prints the image data on a paper which is a recording medium.

When the execution of the linkage function is completed, information indicating the completion of the execution of the linkage function is transmitted from the multifunction machine B and the PC A to the terminal device 10 (S07). The UI unit 20 of the terminal device 10 displays the information indicating the completion of the execution of the linkage function (S08). In addition, when the information indicating the completion of the execution is not displayed even after preset time elapses from the time when the execution instruction is given, the controller 26 of the terminal device 10 may cause the UI unit 20 to display information indicating an error, and transmit the execution instruction information or the information indicating the access request to the multifunction machine B and the PC A again.

Next, the user confirms whether to release the linked state between the multifunction machine B and the PC A (S09), and a process corresponding to the confirmation result is executed (S10). When the linked state is released, the user gives a release instruction by using the terminal device 10. Accordingly, the communication between the terminal device 10 and the multifunction machine B is disconnected, and the communication between the terminal device 10 and the PC A is disconnected. Similarly, the communication between the multifunction machine B and the PC A is also disconnected. When the linked state is not released, the execution instruction may be continuously given.

In addition, the number of devices to be linked may be increased. For example, an image associated with a third device may be sent to the operation assistant, and the three devices including the multifunction machine B and the PC A may be linked to each other. In addition, the information indicating that the multifunction machine B and the PC A have already been identified as devices to be linked is stored in the terminal device 10 or the server 16.

Device identification information indicating devices to be linked and a linkage function information indicating an executed linkage function may be stored in, for example, the terminal device 10 or the server 16. For example, user account information (user identification information) of the user using the terminal device 10 may be acquired, and history information may be created which indicates an association among the user account information, the device identification information indicating devices to be linked, and the linkage function information indicating an executed linkage function. The history information may be stored in, for example, the terminal device 10 or the server 16. The history information may be created by the terminal device 10 or the server 16. By referring to the history information, the linkage function that has been executed and the device group that has been used for the linkage function are specified.

In addition, the devices to be linked (for example, the multifunction machine B and the PC A) may store the user account information of the user making the access request or the terminal identification information indicating the terminal device 10 which is an access requesting source, as history information. The user who has used the devices is specified by referring to the history information. For example, when the user who is using a device is specified because the device is broken down, or when a process of charging for consumables or the like is performed, the user may be specified by using the history information. The history information may be stored in the terminal device 10, the server 16, or another device.

The user account information is stored in advance in, for example, the memory 24 of the terminal device 10, and the controller 26 of the terminal device 10 functions as an example of a user identification unit and identifies the user using the terminal device 10 by reading the user account information of the user from the memory 24. When the user account information of plural users is stored in the memory 24, the user designates his/her own account information by using the terminal device 10. Accordingly, the user account information of the user is read, and the user is identified. As another example, the controller 26 of the terminal device 10 may identify the user by reading user account information of a user who is logging into the terminal device 10. As yet another example, when only one piece of user account information is stored in the same terminal device 10, the controller 26 of the terminal device 10 may identify the user by reading the user account information. In addition, when no user account has been set and no user account information has been created, initial setting is performed, and accordingly, user account information is created.

The use history of a linkage function may be managed for each user, and information indicating linkage functions used in the past by the user indicated by the read user account information may be displayed on the UI unit 20 of the terminal device 10. The information indicating the use history may be stored in the terminal device 10 or the server

16. In addition, information indicating a linkage function which has been used with a frequency equal to or higher than preset use frequency may be displayed. By providing this shortcut function, the user's effort for the operation related to a linkage function is reduced.

As described above, according to the first exemplary embodiment, information on a linkage function is provided when device images associated with devices to be linked are sent to the operation assistant (for example, device images are connected to the assistant image 50). In this way, information on a linkage function is provided by the simple operation using the operation assistant.

In addition, when three or more device images are sent to the assistant image 50, information on a linkage function executable by using the three or more devices is displayed.

In addition, when information of plural devices is transmitted to the operation assistant within a predetermined time limit, the specifying unit 28 may specify a linkage function executable by using the plural devices, and when information of a single device is transmitted to the operation assistant within the time limit, the specifying unit 28 may specify a function (a solo function) that the device has. In this case, information on the linkage function or the solo function specified by the specifying unit 28 is displayed on the display unit of the UI unit 20. A starting time point of the time limit is, for example, a time point when a first device image is connected to the assistant image 50.

For example, in the example illustrated in FIG. 8, in a case where the user does not connect any additional device image to the assistant image 50 within the time limit from a time point when the user connects the device image 52 associated with the multifunction machine B to the assistant image 50, the specifying unit 28 specifies a function (a solo function) associated with the multifunction machine B in the device function management table illustrated in FIG. 6. The controller 26 displays the information on the solo function on the display unit of the UI unit 20. In this case, similarly to the process illustrated in FIG. 10, the information indicating an access request is transmitted to the multifunction machine B, and when the access is permitted, the solo function designated by the user is executed by the multifunction machine B.

Meanwhile, in a case where the user connects an additional device image (for example, the device image 54) to the assistant image 50 within the time limit from the time point when the user connects the device image 52 to the assistant image 50, the specifying unit 28 specifies linkage functions associated with the combination of the multifunction machine B and the PC A in the linkage function management table illustrated in FIG. 7. The controller 26 causes the UI unit 20 to display the information on the linkage functions.

By providing the time limit as described above, a switching between providing a linkage function and providing a solo function is possible.

(Modification 1)

Figure 11:
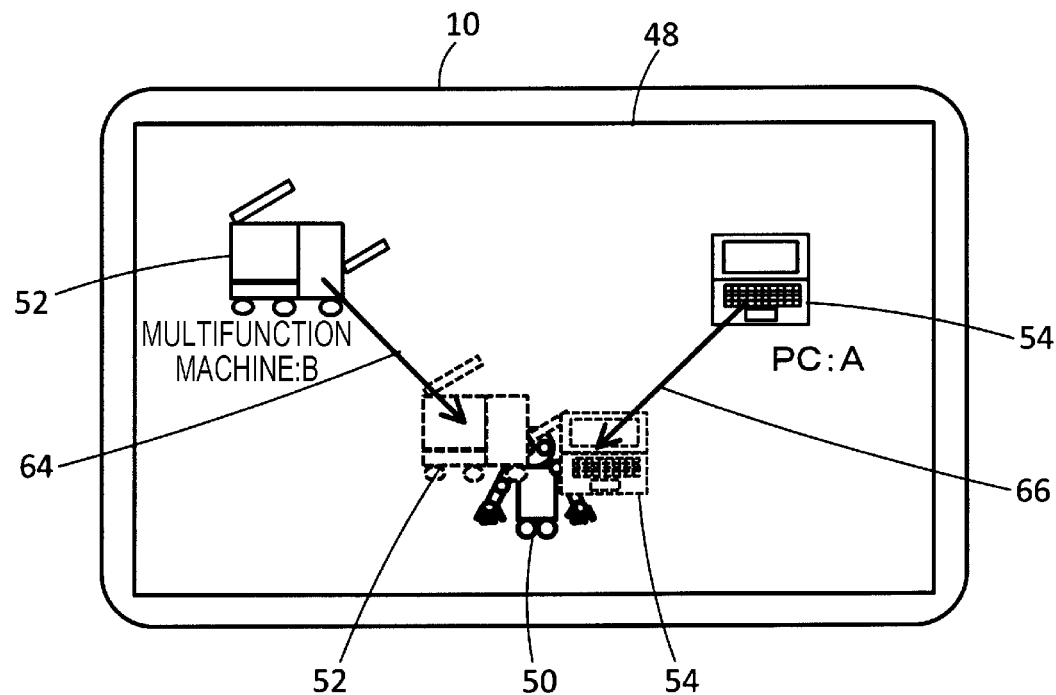
FIG. 11 is a view illustrating a screen.

Hereinafter, Modification 1 will be described with reference to FIG. 11. FIG. 11 illustrates the screen 48. As in FIG. 8, the screen 48 displays the assistant image 50 and the device images 52 and 54. When the user moves the device image 52 to the assistant image 50 and superimposes the device image 52 on the assistant image 50 as indicated by an arrow 64 on the screen 48, the specifying unit 28 (the specifying unit 28 implemented by the operation assistant) identifies the multifunction machine B associated with the device image 52 as a device to be linked. Similarly, when the user superimposes the device image 54 on the assistant image 50 as indicated by an arrow 66 on the screen 48, the specifying unit 28 identifies the PC A associated with the device image 54 as a device to be linked. In this case, as described above, the specifying unit 28 specifies linkage functions associated with the combination of the multifunction machine B and the PC A in the linkage function management table. The information on the specified linkage functions is displayed on the display unit of the UI unit 20 as illustrated in FIG. 9.

In addition, the device image 52 may be first superimposed on the assistant image 50, and then, the device image 54 may be superimposed on the assistant image 50, or the device image 54 may be first superimposed on the assistant image 50, and then, the device image 52 may be superimposed on the assistant image 50.

For example, the user superimposes the device images on the assistant image 50 by performing dragging and dropping operations by using a pointer. In the example illustrated in FIG. 11, the user performs an operation to drag the device image 52 (the device image 52 indicated by a dashed line) and performs an operation to drop the device image 52 at the position where the device image 52 is superimposed on the assistant image 50. In addition, the superimposing operation may be performed according to a voice instruction from the user.

In addition, when plural device images are superimposed on the assistant image 50 within the time limit, the specifying unit 28 may specify a linkage function executable by using the devices associated with the plural device images. When one device image is superimposed on the assistant image 50 within the time limit, the specifying unit 28 may specify a function (a solo function) that the device associated with the device image has. A starting time point of the time limit is a time point when a first device image is superimposed on the assistant image 50.

For example, in the example illustrated in FIG. 11, in a case where the user does not superimpose any additional device image on the assistant image 50 within the time limit from the time point when the user superimposes the device image 52 associated with the multifunction machine B on the assistant image 50, the specifying unit 28 specifies a function (a solo function) associated with the multifunction machine B in the device function management table illustrated in FIG. 6. The controller 26 displays the information on the solo function on the display unit of the UI unit 20. In this case, similarly to the process illustrated in FIG. 10, the information indicating an access request is transmitted to the multifunction machine B, and when the access is permitted, the solo function designated by the user is executed by the multifunction machine B.

Meanwhile, in a case where the user superimposes an additional device image (for example, the device image 54) on the assistant image 50 within the time limit from the time point when the user superimposes the device image 52 on the assistant image 50, the specifying unit 28 specifies linkage functions associated with the combination of the multifunction machine B and the PC A in the linkage function management table illustrated in FIG. 7. The controller 26 causes the UI unit 20 to display the information on the linkage functions.

Figure 12:
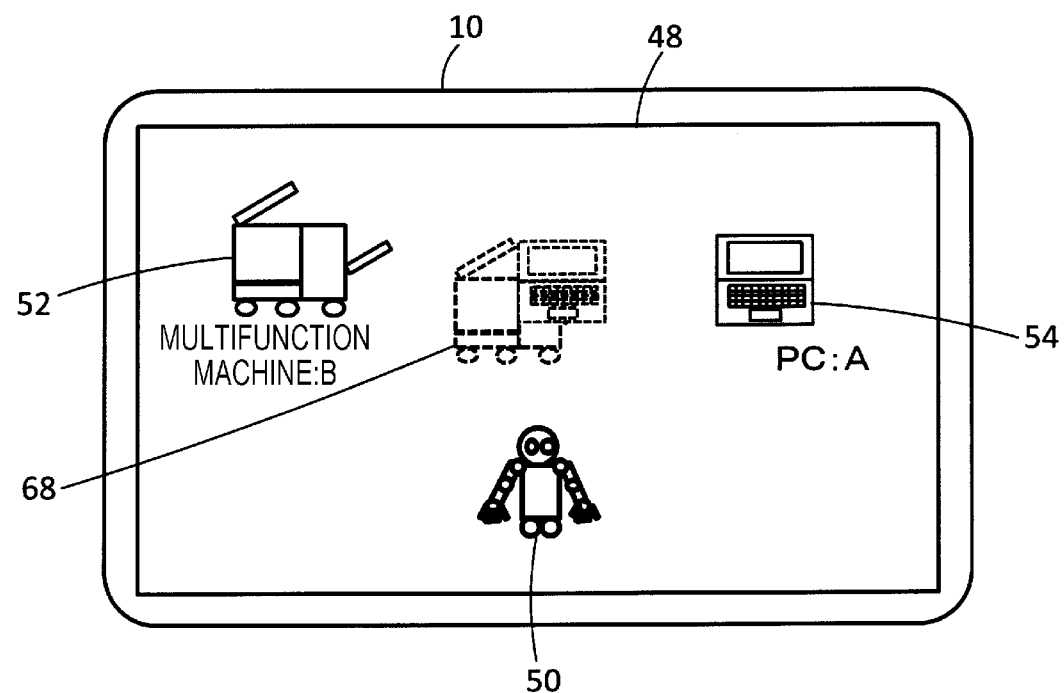
FIG. 12 is a view illustrating a screen.

When plural device images are superimposed on the assistant image 50, the controller 26 of the terminal device 10 may generate a new composite image representing a state where the plural device images are superimposed on each other. For example, when the device images 52 and 54 are superimposed in this order on the assistant image 50 as illustrated in FIG. 11, a new composite image 68 generated by grouping the device images 52 and 54 is displayed as illustrated in FIG. 12. The composite image 68 is generated by, for example, the controller 26 of the terminal device 10. The composite image 68 represents a state where the device image 54 is superimposed on the device image 52. The composite image 68 may be an image representing the state where the device image 54 is superimposed on the device image 52 or an image schematically representing the state (for example, an icon). Even when the composite image 68 is generated, the original device images 52 and 54 are displayed in their original state. When the device images 54 and 52 are superimposed in this order on the assistant image 50, a composite image representing a state where the device image 52 is superimposed on the device image 54 is generated.

Figure 13:
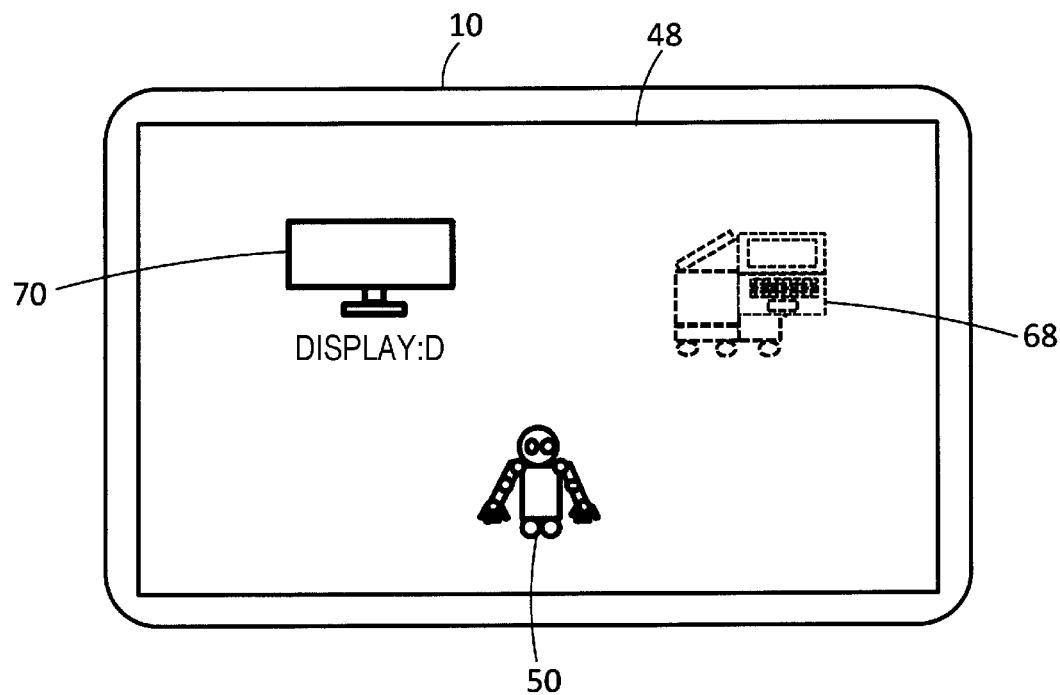
FIG. 13 is a view illustrating a screen.

When the composite image 68 is generated as described above, the controller 26 of the terminal device 10 leaves and displays the composite image 68 on the screen 48. When the composite image 68 is superimposed on the assistant image 50 and another device image is superimposed on the assistant image 50, the plural devices associated with the composite image 68 and the device associated with the other device image are identified as devices to be linked. For example, as illustrated in FIG. 13, it is assumed that a display D is identified, and a device image 70 associated with the display D is displayed on the screen 48. When the composite image 68 is superimposed on the assistant image 50 by the user's operation, and further, the device image 70 is superimposed on the assistant image 50 by the user's operation, the specifying unit 28 identifies the multifunction machine B and the PC A associated with the composite image 68 as devices to be linked, and further, identifies the display D associated with the device image 70 as a device to be linked. In this case, the specifying unit 28 specifies a linkage function associated with the combination of the PC A, the multifunction machine B, and the display D in the linkage function management table illustrated in FIG. 7. The information on the linkage function is displayed on the display unit of the UI unit 20. Further, a new composite image representing a state where the device image 70 is superimposed on the composite image 68 is generated and displayed.

As described above, the number of devices to be linked may be increased by displaying a composite image, superimposing the composite image on the assistant image 50, and superimposing another device image on the assistant image 50 as described above. Further, since the composite image represents a state where devices to be linked are superimposed on each other, the display of the composite image allows the user to easily visually grasp which devices are designated as devices to be linked.

The composite image described above may be used as a shortcut image when the linkage function is executed next time and thereafter. For example, when the user gives an instruction to register the composite image as a shortcut image by using the terminal device 10, a registration screen is displayed on the display unit of the UI unit 20. The registration screen displays the composite image, and displays information indicating the registered contents of the linkage function executable by using the plural devices to be linked. For example, information indicating the linkage function name, an outline of the linkage function, and devices required for the linkage function is displayed as the information indicating the registered contents. The user may edit the registered contents (for example, the linkage function name and an outline of the linkage function) by using the terminal device 10. When the user gives the registration instruction on the registration screen, the composite image is registered as a shortcut image. In addition, when the user edits the registered contents, the edited contents are also registered in association with the composite image. The shortcut image which is the composite image is generated and displayed on the display unit of the UI unit 20. The shortcut image is generated by, for example, the controller 26 of the terminal device 10. When plural shortcut images are generated and registered, the display unit of the UI unit 20 may display a list of the shortcut images. In addition, the shortcut image and the information indicating the registered contents are stored in the terminal device 10. As another example, the shortcut image and the information indicating the registered contents may be stored in the server 16 in association with the user account information. In this case, when the user account information is transmitted from the terminal device 10 to the server 16, the information associated with the user account information (the shortcut image and the information indicating the registered contents) is transmitted from the server 16 to the terminal device 10 and displayed in the terminal device 10.

In addition, the shortcut image may include information (for example, an image) indicating a status of each device to be linked. For example, when each device to be linked is in a state of being able to execute the linkage function, an image indicating the state (for example, a green or blue image) is displayed as the information indicating the status. When each device to be linked is in a state of being unable to execute the linkage function, an image indicating the state (for example, a white or red image) is displayed as the information indicating the status. The state where the device is able to execute the linkage function refers to, for example, a state where the device is not being currently used or a state where the device is not broken down. The state where the device is unable to execute the linkage function refers to, for example, a state where the device is being currently used or a state where the device is broken down. For example, the operation assistant acquires information indicating a status of each device to be linked, from the device to be linked, and displays status information based on the acquired information. The acquisition of the information may be performed by the server 16.

In a case where a shortcut image is displayed on the UI unit 20 of the terminal device 10, when the user designates the shortcut image and makes an instruction to execute a linkage function (for example, when the user clicks or double-clicks the shortcut image), information indicating a linkage function associated with the shortcut image may be displayed or the execution of the linkage function may be controlled. In addition, when the user superimposes a shortcut image on the assistant image 50 or connects a shortcut image to the assistant image 50, information indicating a linkage function associated with the shortcut image may be displayed, or the execution of the linkage function may be controlled.

As described above, the linkage function and the shortcut image are managed in association with each other, so that the user's burden to perform the operation to execute the linkage function next time and thereafter is lessened.

In addition, as another example of the operation, plural device images may be selected by the user (for example, plural device images are selected by performing an operation to encircle the plural device images on the screen), and the plural device images may be collectively connected to or superimposed on the assistant image 50. By such operation as well, the devices associated with the plural device images, respectively, are identified as devices to be linked.

(Modification 2)

Hereinafter, Modification 2 will be described. In Modification 2, devices associated with device images are identified as devices to be linked when the device images are superimposed on the assistant image 50 as in Modification 1. In Modification 2, when the user performs the operation to superimpose device images on the assistant image 50, the controller 26 executes a display presentation such that the device images are sucked into the assistant image 50.

Figure 14:
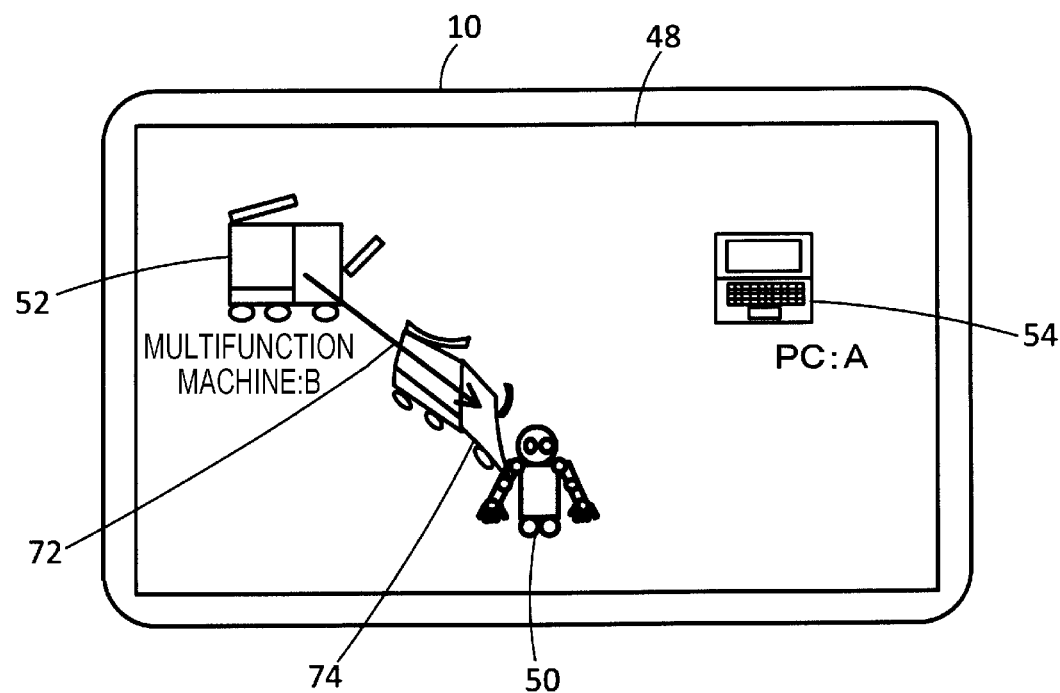
FIG. 14 is a view illustrating a screen.

FIG. 14 illustrates an example of the display. For example, when the user drags the device image 52 to bring the device image 52 closer to the assistant image 50 on the screen 48 as indicated by an arrow 72, the controller 26 generates a device image 74 by deforming the device image 52 such that, for example, a portion of the device image 74 extends toward the assistant image 50, and displays the device image 74 on the screen 48. For example, the device image 74 has a shape which is tapered toward the assistant image 50. For example, when the distance between the device image 52 and the assistant image 50 (distance on the screen 48) becomes equal to or less than a predetermined threshold value in a state where the device image 52 is being moved toward the assistant image 50, the controller 26 generates the device image 74 by deforming the device image 52. When the user further moves the device image 74 closer to the assistant image 50 and superimposes the device image 74 on the assistant image 50, the device associated with the device image 74 is identified as a device to be linked, and the controller 26 eliminates the device image 74 from the screen 48. That is, the controller 26 executes a presentation such that the device image 74 disappears from the position where the assistant image 50 is displayed. At this time, the controller 26 executes a display presentation as if the device image 74 is sucked into the assistant image 50. In addition, the device image 52 may be displayed at the original position even after the device image 52 is superimposed on the assistant image 50. In addition, the device image 52 may not be displayed on the screen 48 after the device image 52 is superimposed on the assistant image 50, and the device image 52 may be displayed on the screen 48 after the execution of the linkage function is completed.

By executing the presentation described above, it is possible to visually confirm the state where the device image operated by the user is being sent to the operation assistant.

In addition, when a linkage function associated with a combination of plural devices selected by the user is not registered in the linkage function management table, the specifying unit 28 determines that the usable linkage function is not registered. In this case, the controller 26 causes the UI unit 20 to display a message indicating that the usable linkage function is not registered. Even in this case, the linkage function may become usable according to, for example, an updating status of a device. In this case, the specifying unit 28 specifies the linkage function that becomes usable.

In addition, when a linkage function is not executable by a device sent to the operation assistant, the controller 26 may execute a presentation such that the device image associated with the device is displayed again. For example, in a case where a device image is superimposed on the assistant image 50 and disappears from the position where the assistant image 50 is displayed as described above, when a linkage function is not executable by the function associated with the device image, the controller 26 executes a presentation such that the device image is displayed again. At this time, the controller 26 may execute a display presentation such that the device image associated with the device is ejected from the assistant image 50.

Figures 15, 16:
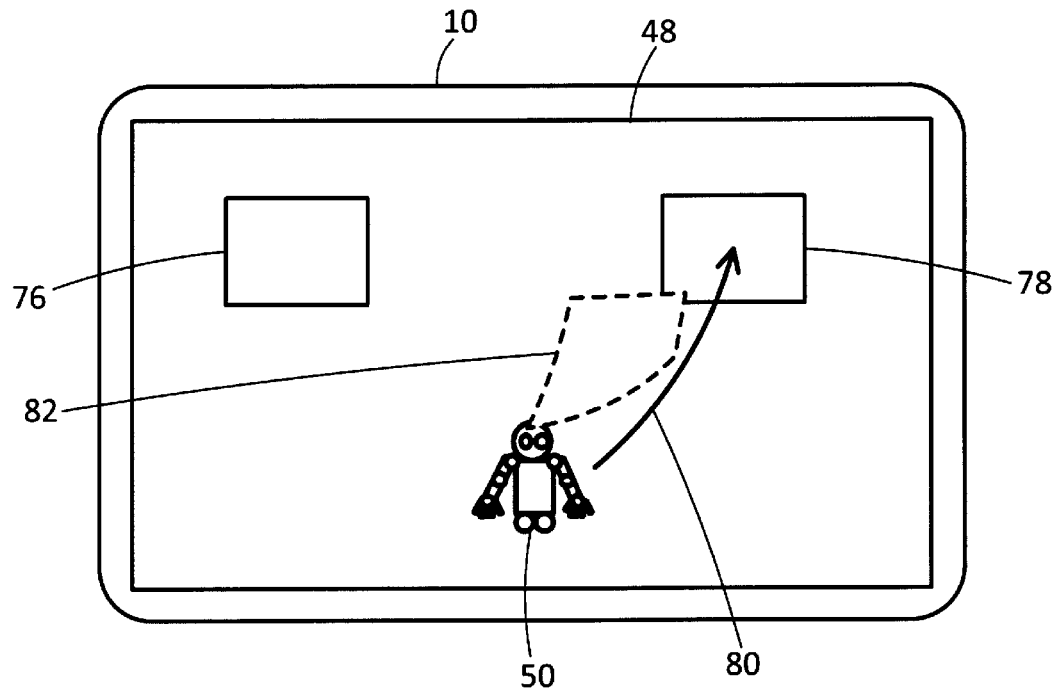
FIG. 15 is a view illustrating a screen.
FIG. 16 is a view illustrating a linkage function management table according to Modification 3.

FIG. 15 illustrates an example of the display. For example, it is assumed that on the screen 48, the user superimposes a device image 76 on the assistant image 50, and then, superimposes a device image 78 on the assistant image 50. As a result of the superimposing operation, the device images 76 and 78 disappear from the position where the assistant image 50 is displayed. In addition, the device images 76 and 78 are displayed at their respective movement source positions. When a linkage function executable by using the device associated with the device image 76 and the device associated with the device image 78 (a linkage function corresponding to the combination of the two devices) is not registered in the linkage function management table, the controller 26 executes a presentation so as to display again the device image 78 superimposed relatively later at the position where the assistant image 50 is displayed. At this time, the controller 26 may deform the shape of the device image 78 superimposed relatively later to generate a device image 82 having a shape expanding outward from the assistant image 50 as indicated by an arrow 80, and display the device image 82 on the screen 48. The controller 26 moves the device image 82 to the position where the device image 78 is originally displayed, and then, eliminates the device image 82 from the screen 48. In addition, the controller 26 may execute a display presentation as if the device image 78 which has been moved over the assistant image 50 is shot from the assistant image 50 to the position where the device image 78 is originally displayed, without deforming the shape of the device image 78. The display presentation may be similarly executed for the device image 76.

By executing the presentation described above, it is possible to visually confirm that the linkage function is not executable.

(Modification 3)

Hereinafter, Modification 3 will be described. In Modification 3, the display of a linkage function is controlled according to an order of transmitting information of a device to the operation assistant. Hereinafter, Modification 3 will be described in detail with reference to FIGS. 16 to 18.

FIG. 16 illustrates a linkage function management table according to Modification 3. In the linkage function management table, for example, information indicating a combination of device IDs, information indicating a device name of each device to be linked (for example, a type of each device), information indicating a linkage function (linkage function information), information indicating an access order, and information indicating a priority are associated with each other. The device ID and the device name correspond to an example of the device identification information. In addition, a linkage function executable by using three or more devices may be set. In this case, a combination of the three or more devices and a linkage function are associated with each other, and the association is registered in the linkage function management table.

The access order corresponds to an order of designating a device and corresponds to, for example, an order of connecting a device image to the assistant image 50 or superimposing a device image on the assistant image 50. For example, when the user sequentially connects plural device images to the assistant image 50 or superimposes plural device images on the assistant image 50, the sequential order corresponds to the access order. Specifically, when the user connects a first device image to the assistant image 50, and then, connects a second device image to the assistant image

50, a first device associated with the first device image is considered designated first, and a second device associated with the second device image is considered designated second. In addition, when the user superimposes the first device image on the assistant image 50, and then, superimposes the second device image on the assistant image 50, the first device associated with the first device image is considered designated first, and the second device associated with the second device image is considered designated second.

The priority refers to a priority for displaying information on a linkage function. For example, the combination of the PC A and the multifunction machine B is associated with the "scanning transmitting function" and the "printing function" which are linkage functions. For example, when device images associated with devices are connected to or superimposed on the assistant image 50 in an order of the multifunction machine B and the PC A, the "scanning transmitting function" has a "first priority," and the "printing function" has a "second priority." In this case, the information on the "scanning transmitting function" is displayed in preference to the information on the "printing function." For example, the information on the "scanning transmitting function" is displayed at a higher rank or earlier than the information on the "printing function." Meanwhile, when device images associated with devices are connected to or superimposed on the assistant image 50 in an order of the PC A and the multifunction machine B, the "printing function" has a "first priority," and the "scanning transmitting function" has a "second priority." In this case, the information on the "printing function" is displayed in preference to the information on the "scanning transmitting function."

Figure 17:
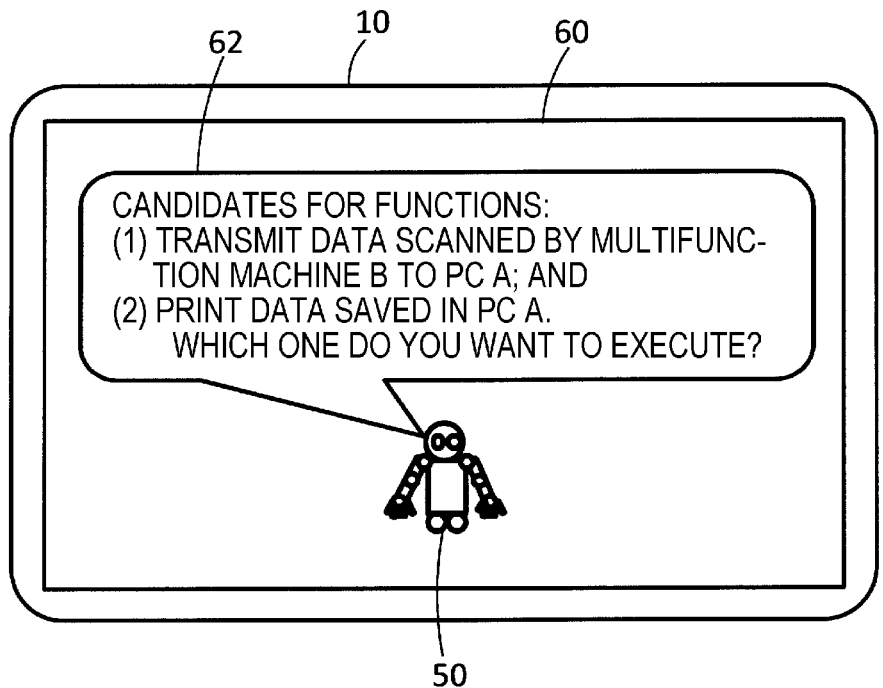
FIG. 17 is a view illustrating a screen.

FIG. 17 illustrates an example of the display according to the priorities. For example, when the device images 52 and 54 are connected to or superimposed on the assistant image 50 in an order of the multifunction machine B and the PC A, the "scanning transmitting function" has a "first priority," and the "printing function" has a "second priority." Thus, the information on the "scanning transmitting function" is displayed in preference to (for example, at a higher rank) than the information on the "printing function." When the user designates a linkage function and gives an instruction to execute the linkage function on the screen 60, the designated linkage function is executed.

Figure 18:
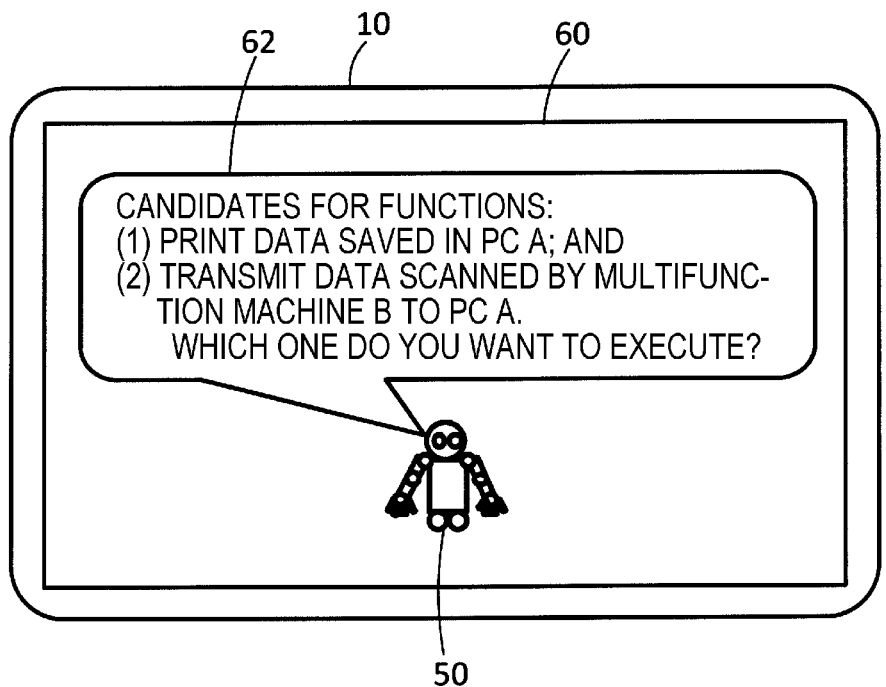
FIG. 18 is a view illustrating a screen.

FIG. 18 illustrates another example of the display according to the priorities. For example, when the device images 54 and 52 are connected to or superimposed on the assistant image 50 in an order of the PC A and the multifunction machine B, the "printing function" has a "first priority," and the "scanning transmitting function" has a "second priority." Thus, the information on the "printing function" is displayed in preference to (for example, at a higher rank) than the information on the "scanning transmitting function."

As described above, the order of displaying information on a linkage function is changed according to an order of transmitting information on a device to the operation assistant. The access order of a device (an order of transmitting information of a device to the operation assistant) also serves as an order of using a function of each device or an order of moving data between linked devices. Further, the operation to designate a device also serves as an operation to designate the order of using a function or the order of moving data. Thus, information on a linkage function which is predicted to be used by the user is preferentially displayed, by changing the order of displaying information on a linkage function according to the access order. That is, information on a linkage function which is highly likely to be used by the user is preferentially displayed. For example, when device images associated with devices are transmitted to the assistant image 50 in an order of the multifunction machine B and the PC A, it is predicted that the user is to use a linkage function of "transmitting data from the multifunction machine B to the PC A by using the function of the multifunction machine B in preference to the PC A." In addition, when device images associated with devices are transmitted to the assistant image 50 in an order of the PC A and the multifunction machine B, it is predicted that the user is to use a linkage function of "transmitting data from the PC A to the multifunction machine B by using the function of the PC A in preference to the multifunction machine B." Thus, information on a linkage function which is highly likely to be used by the user is preferentially displayed, by changing the order of displaying information on a linkage function according to the order of selecting a device.

(Modification 4)

Hereinafter, Modification 4 will be described. In Modification 4, different functions are assigned to respective portions in a device image associated with a device. When portions in device images are designated by the user and the portions are connected to or superimposed on the assistant image 50, information on a linkage function executable by using the functions assigned to the portions is displayed. Hereinafter, Modification 4 will be described in detail.

FIG. 19 illustrates an example of a device function management table according to Modification 4. In the device function management table, for example, a device ID, information indicating a device name (for example, a type of a device), information indicating a position in a device image (a position of a portion), and information indicating a function corresponding to a position in a device image (a position of a portion) (function information), and an image ID are associated with each other. The position in a device image is a specific position (a specific portion) in a device image associated with a device and is, for example, a specific position in a device image schematically representing a device or a specific position in a device image captured by the camera. The respective specific positions (portions) in a device image are associated with different functions. In addition, a linkage function executable by using three or more portions may be set. In this case, the combination of the three or more portions and a linkage function are associated with each other, and the association is registered in the linkage function management table. In addition, a linkage function executable by using a portion and an entire device may be set, and the association between the combination of the portion and the entire device and the linkage function may be registered in the linkage function management table.

Figure 20:
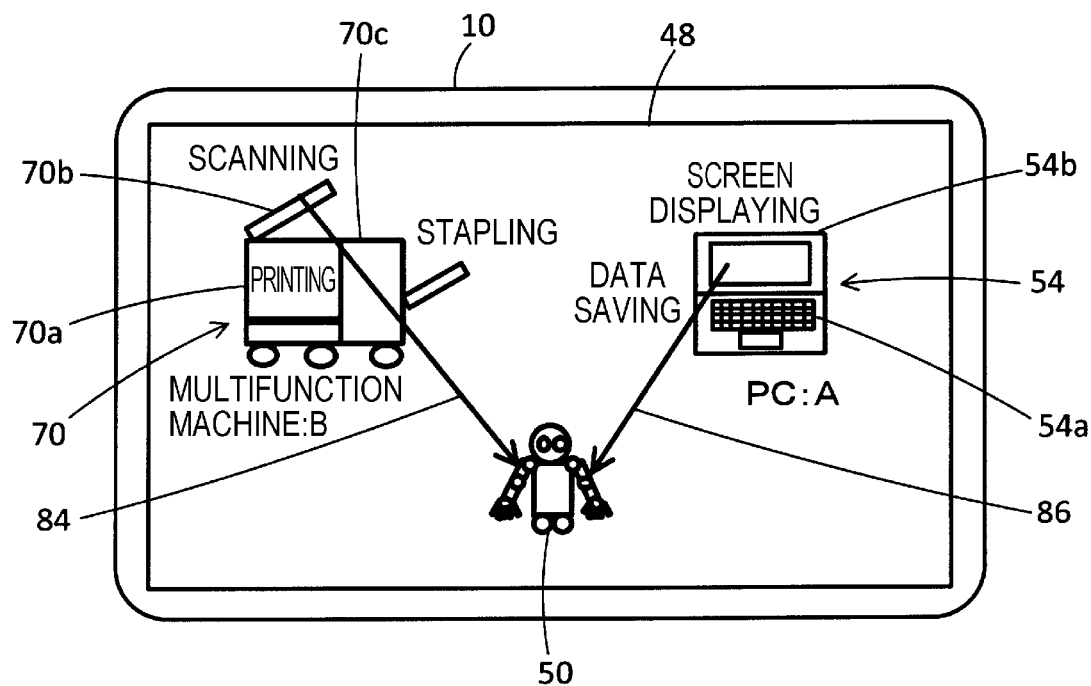
FIG. 20 is a view illustrating a screen.

FIG. 20 illustrates an example of a screen displayed on the display unit of the UI unit 20. For example, the multifunction machine B and the PC A are identified, and the device images 70 and 54 are displayed on the screen 48. Further, the portions included in each of the multifunction machine B and the PC A are also identified. The identification of the portions is also implemented by using the identification technique described above (for example, the AR technique). For example, each portion of a device is identified by capturing each portion and applying the markerless AR technique.

For example, the "printing function" is assigned to the specific position associated with the main body portion of the multifunction machine B (a portion image 70*a*) in the device image 70. The "scanning function" is assigned to the specific position associated with the document cover, the document glass, the automatic document feeder of the multifunction machine B (a portion image 70b) in the device image 70. A "stapling function" is assigned to the specific position associated with the post-processing device (a portion image 70c) in the device image 70. The "stapling function" is a function of binding output papers with a staple. Further, a "data saving function" is assigned to the specific position associated with the main body portion of the PC A (a portion image 54a) in the device image 54. A "screen displaying function" is assigned to the specific position associated with the display unit of the PC A (a portion image 54b) in the device image 54. The "data saving function" is a function of saving data transmitted from another device in the PC A. The "screen displaying function" is a function of displaying data transmitted from another device by the PC A.

In addition, the controller 26 of the terminal device 10 may display a name of a function assigned to a specific position in a device image (for example, printing or scanning), on the screen 48. Accordingly, the user is provided with information from which the user may easily grasp which function is associated with the specific position. In addition, the name of the function may not be displayed.

When the user designates portions associated with functions in device images and connects the images of the portions to the assistant image 50 or superimposes the images on the assistant image 50, the portions are identified as portions to be linked. For example, when the portion image 70b is connected to the assistant image 50 as indicated by an arrow 84, and the portion image 54b is connected to the assistant image 50 as indicated by an arrow 86, the multifunction machine B associated with the device image 70 including the portion image 70b and the PC A associated with the device image 54 including the portion image 54b are designated as devices to be linked, and the "scanning function" corresponding to the portion image 70b and the "screen displaying function" corresponding to the portion image 54b are designated.

When the devices to be linked (for example, the PC A and the multifunction machine B) are identified, the specifying unit 28 specifies linkage functions associated with the combination of the PC A and the multifunction machine B in the linkage function management table illustrated in FIG. 7. Further, the specifying unit 28 specifies the functions associated with the portions in the device images sent to the operation assistant, by referring to the device function management table illustrated in FIG. 19. Then, the specifying unit 28 raises the priority of the linkage function which uses the functions associated with the portions, and lowers the priority of the linkage function which does not use the functions, among the linkage functions executable by using the PC A and the multifunction machine B. The controller 26 of the terminal device 10 causes the UI unit 20 to display information on linkage functions as information on linkage function candidates according to the priorities.

Figure 21:
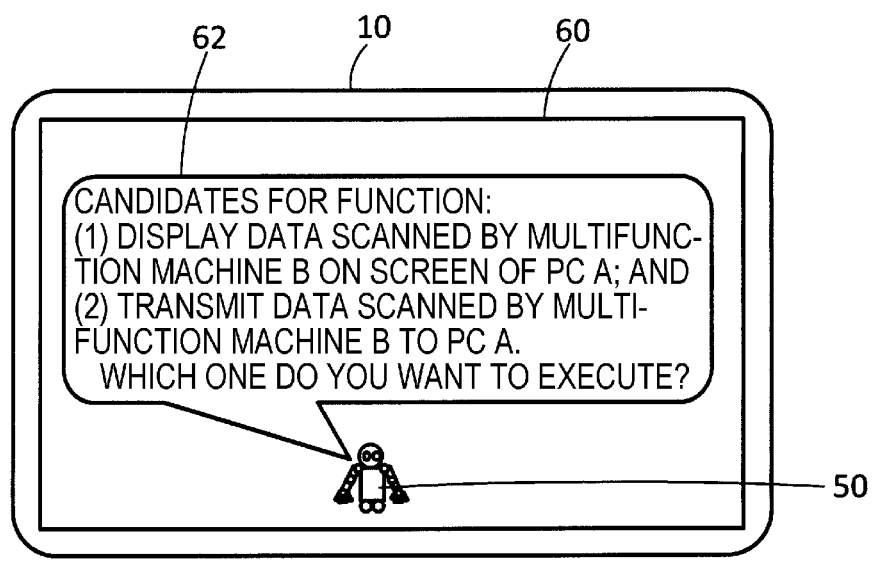
FIG. 21 is a view illustrating a screen.

For example, as illustrated in FIG. 21, the controller 26 of the terminal device 10 causes the display unit of the UI unit 20 to display a screen 60, and displays the information on the linkage functions on the screen 60. Since the "scanning function" and the "screen displaying function" are designated in this order by the user, information on a "scanning transmitting displaying function" which is a linkage function executable by using the "scanning function" and the "screen displaying function" is displayed in preference to (for example, at a higher rank) information on the other linkage functions. For example, the information on the "scanning transmitting displaying function" is displayed in preference to information on a "scanning transmitting saving function" which is a linkage function executable by using the "scanning function" and "data saving function." In addition, the "scanning transmitting displaying function" is a function of transmitting data generated by scanning by the multifunction machine B to the PC A and display the data on the screen of the PC A. The "scanning transmitting saving function" is a function of transmitting data generated by scanning by the multifunction machine B to the PC A and save the data in the PC A.

According to Modification 4, when devices to be linked have plural functions, the functions are individually designated, and information on a linkage function executable by using the designated functions is preferentially displayed. Thus, a linkage function which is predicted to be used by the user is preferentially displayed.

In addition, the linkage function may be a function using a combination of portions of the same device or portions of different devices, a function using a combination of an entire device and a portion of a device, or a function using a combination of entire devices.

In addition, Modifications 3 and 4 may be combined with each other such that the display of information on a linkage function may be switched according to an order of sending information of a device or a portion of a device to the operation assistant.

In addition, when information of one portion is sent to the operation assistant, information on a solo function executable by using the one portion is displayed on the display unit of the UI unit 20.

Hereinafter, another example of the process using portion images will be described.

FIG. 22 illustrates another example of the device function management table according to Modification 4. In the device function management table, for example, a device ID, information indicating a device name (for example, a type of a device), information indicating a name of a portion of a device (for example, a type of the portion), a portion ID which is portion identification information for identifying the portion, information indicating a function assigned to the portion (a function that the portion has), and a portion image ID for identifying a portion image associated with the portion are associated with each other. The portion image represents the external appearance of a portion of a device obtained by capturing with the camera. In addition, a portion image schematically representing a portion of a device may be associated with the portion. For example, different functions are assigned to respective portions of a device.

As a specific example, the screen displaying function is assigned to the display portion of the PC A, and information indicating the screen displaying function is associated with the portion image ID of the portion image associated with the display unit. The screen displaying function is a function of displaying information by the PC A. The data saving function is assigned to the main body portion of the PC A, and information indicating the data saving function is associated with the portion image ID of the portion image associated with the main body portion. The data saving function is a function of saving data in the PC A.

In addition, the printing function is assigned to the main body portion of the multifunction machine B, and information indicating the printing function is associated with the portion image ID of the portion image associated with the main body. The scanning function is assigned to the reading unit of the multifunction machine B (for example, the portion associated with the document cover, the document glass, or the automatic document feeder of the multifunction machine B), and information indicating the scanning function is associated with the portion image ID of the portion image associated with the reading portion. The stapling function is assigned to the post-processing device of the multifunction machine B, and information indicating the stapling function is associated with the portion image ID of the portion image associated with the post-processing device. The stapling function is a function of binding output papers with a staple.

The functions assigned to the portions of the devices are specified (identified) by using the markerless AR technique. For example, when a portion of a device is captured by a camera (for example, the camera 22 of the terminal device 10), the specifying unit 28 specifies (identifies) a function associated with the external appearance image data in the device function management table illustrated in FIG. 22. Accordingly, the function assigned to the captured portion is specified (identified). For example, when the main body portion of the multifunction machine B is captured by the camera 22, the specifying unit 28 specifies the printing function associated with the external appearance image data representing the main body portion of the multifunction machine B in the device function management table. Accordingly, the printing function assigned to the main body portion of the multifunction machine B is specified.

In addition, the functions assigned to the portions of the devices may be specified (identified) by using the marker AR technique. For example, each portion of a device is provided with a marker such as a two-dimensional barcode obtained by encoding portion identification information for identifying the portion (for example, the portion ID). When the marker provided in the portion is captured by a camera and the marker AR technique is applied, the portion identification information (for example, the portion ID) of the portion is acquired. When the portion identification information is acquired as described above, the specifying unit 28 specifies (identifies) a function associated with the portion identification information (for example, the portion ID) in the device function management table illustrated in FIG. 22.

FIG. 23 illustrates an example of a linkage function management table according to Modification 4. The linkage function management table is information indicating a linkage function using functions that plural portions have. In the linkage function management table, for example, information indicating a combination of portions of devices, information indicating a combination of portion IDs, and information indicating a linkage function executable by using functions that the plural portions included in the combination have are associated with each other. In addition, in the linkage function management table, information indicating a combination of a portion of a device and an entire device and information indicating a linkage function using a function that the portion of the device has and a function that the entire device has may be associated with each other.

As a specific example, the "printing function" is assigned as a linkage function to a combination of the display unit of the PC A and the main body portion of the multifunction machine B. The "printing function" which is a linkage function is a function of transmitting data saved in the PC A to the multifunction machine B and print the data by the multifunction machine B.

Further, the "printing function" is assigned as a linkage function to a combination of the main body portion of the multifunction machine B and the main body portion of the projector C. The "printing function" which is a linkage function is a function of transmitting data projected by the projector C to the multifunction machine B and print the data by the multifunction machine B.

Further, a "scanning projecting function" is assigned as a linkage function to a combination of the reading unit of the multifunction machine B and the main body portion of the projector C. The "scanning projecting function" which is a linkage function is, for example, a function of transmitting data generated by scanning by the multifunction machine B to the projector C and project the data by the projector C.

In addition, the linkage function may be a function executable by using functions that plural portions included in the same device have, or a function executable by using functions that portions of plural different devices have. In addition, the linkage function may be a function executable by using functions that three or more portions have.

For example, when the user connects plural portion images to the assistant image 50 or superimposes plural portion images on the assistant image 50, the specifying unit 28 specifies (identifies) a linkage function associated with the combination of the portions associated with the plural portion images, respectively, in the linkage function management table illustrated in FIG. 23. For example, when the portion image associated with the main body portion of the multifunction machine B and the portion image associated with the main body portion of the projector C are connected to or superimposed on the assistant image 50, the specifying unit 28 specifies, for example, the "printing function" which is a linkage function associated with the combination of the main body of the multifunction machine B and the main body of the projector C in the linkage function management table illustrated in FIG. 23. The information on the linkage function is displayed on the display unit of the UI unit 20 as illustrated in FIG. 21.

In addition, Modifications 3 and 4 may be combined with each other such that the display of information on a linkage function may be switched according to an order of connecting device images or portion images to the assistant image 50 or superimposing device images or portion images on the assistant image 50.

Hereinafter, an example of an operation performed when superimposing portion images on the assistant image 50 will be described with reference to FIG. 24. For example, when the user moves the portion image 70*b* and superimposes the portion image 70*b* on the assistant image 50 as indicated by an arrow 88, the specifying unit 28 identifies the portion associated with the portion image 70*b* as a portion to be linked. Further, when the user moves the portion image 54*b* and superimposes the portion image 54*b* on the assistant image 50 as indicated by an arrow 90, the specifying unit 28 identifies the portion associated with the portion image 54*b* as a portion to be linked. Then, the specifying unit 28 specifies a linkage function associated with the reading unit of the multifunction machine B associated with the portion image 70*b* and the display unit of the portion image 54*b*, in the linkage function management table illustrated in FIG. 23. The information on the linkage function is displayed on the display unit of the UI unit 20 as illustrated in FIG. 21.

In addition, when a portion image and an entire device image are connected to or superimposed on the assistant image 50, a linkage function executable by using the portion associated with the portion image and the device associated with the device image may be specified, and the information on the linkage function may be displayed on the display unit of the UI unit 20.

(Modification 5)

Hereinafter, Modification 5 will be described. In Modification 5, the operation assistant has a learning function, and the display of a linkage function is controlled according to information obtained by the operation assistant. The operation assistant acquires information on the user (for example, information indicating an operation history of the terminal device 10, information indicating an operation history of a device, and information indicating a behavior history), and information on the devices 12 and 14 (for example, information indicating a use history and information indicating a state of each device), by the learning function. The operation assistant may acquire the information from the terminal device 10, devices such as the devices 12 and 14, the server 16, another device (for example, a cloud system), or an operation assistant stored in another device (for example, AI stored in another device).

The controller 26 controls the display of a linkage function according to the information acquired by the operation assistant. For example, when the operation assistant acquires information indicating a history of use of a device by the user or information indicating the user's schedule (plan) (schedule information), the controller 26 refers to the use history or the schedule, and preferentially display information on a linkage function which is highly likely to be used by the user, on the display unit of the UI unit 20. For example, when the user connects plural device images to the assistant image 50 or superimposes plural device images on the assistant image 50, plural linkage functions executable by using the devices associated with the plural device images, respectively, is specified. The controller 26 analyzes the use history or the schedule, and preferentially displays information on a linkage function which is highly likely to be used by the user among the plural linkage functions, on the display unit of the UI unit 20. For example, the controller 26 compares timings and schedules in which the plural devices are designated as devices to be linked in the past, and preferentially displays information on a linkage function which is highly likely to be used at the present time, on the display unit of the UI unit 20.

As a specific example, it is assumed that the user transmitted first and second device images to the assistant image 50 in the morning of a past day when the user went out in the afternoon, and a linkage function Z is executed. In the circumstance where the use history described above exists, when the user transmits the first and second device images to the assistant image 50 at a timing in the morning of a day when the user plans to go out in the afternoon, the controller 26 determines that the linkage function Z is highly likely to be used, and preferentially displays the information on the linkage function Z on the display unit of the UI unit 20.

As another specific example, it is assumed that first and second device images are transmitted to the assistant image 50 in a past certain time period, and the video recording function is executed as a linkage function so that a program of a channel X is recorded. In the circumstance where the use history described above exists, when the first and second device images are transmitted to the assistant image 50 at a timing included in the past certain time period, the controller 26 determines that the video recording function described above is highly likely to be used, and preferentially displays the information on the recording function (for example, information on the function of recording the channel X) on the display unit of the UI unit 20.

In addition, when the devices associated with the device images sent to the assistant image 50 are being used or broken down, the controller 26 may display the information on the linkage function executable by using the devices, in a state where the priority of the information is lowered, on the display unit of the UI unit 20. When the devices are not being broken down and are not being used, the controller 26 preferentially displays the information on the linkage function executable by using the devices on the display unit of the UI unit 20. Accordingly, the information on an immediately usable linkage function is preferentially provided to the user.

(Modification 6)

Hereinafter, Modification 6 will be described. Plural operation assistants may exist in the terminal device 10. For example, an operation assistant is assigned to each device, and an assistant image 50 associated with each device is displayed on the display unit of the UI unit 20. For example, when plural devices are identified, plural assistant images 50 are displayed on the display unit of the UI unit 20. Each operation assistant may manage the device assigned to the own operation assistant, or may create and issue a reply to a user's request regarding the device assigned to the own operation assistant. Each operation assistant may share information with the other operation assistants by communicating with the other operation assistants.

For example, a program for implementing an operation assistant associated with the multifunction machine B and a program for implementing an operation assistant associated with the PC A are installed in the terminal device 10, such that each of the operation assistant associated with the multifunction machine B and the operation assistant associated with the PC A functions in the terminal device 10. In addition, plural operation assistants may be implemented by one program.

The controller 26 may control the display of a linkage function according to information acquired by each operation assistant, as in Modification 5. For example, the controller 26 changes information on a linkage function according to information shared by plural operation assistants (for example, information such as a use history or a state of a device).

(Modification 7)

Hereinafter, Modification 7 will be described. In Modification 7, an operation assistant recommends a device to be linked. For example, when the user connects a device image to the assistant image 50 or superimposes a device image on the assistant image 50, the specifying unit 28 identifies the device associated with the device image, and specifies a device capable of executing a linkage function in combination with the identified device by referring to the linkage function management table. The controller 26 displays the information on the device specified by the specifying unit 28 on the display unit of the UI unit 20. For example, when the user connects the device image 52 associated with the multifunction machine B to the assistant image 50 or superimposes the device image 52 on the assistant image 50, the specifying unit 28 specifies a device (for example, a PC or a projector) capable of executing a linkage function in combination with the multifunction machine B by referring to the linkage function management table. The information on the device (for example, a PC or a projector) is displayed on the display unit of the UI unit 20. Accordingly, the device to be linked is provided to the user.

In addition, the specifying unit 28 may specify a device which is actually used in combination with the device associated with the device image described above (for example, the multifunction machine B), based on a use history of a linkage function (a history of use by the user or another user), and the controller 26 may display the information on the specified device, on the display unit of the UI unit 20. For example, the specifying unit 28 may specify a device which is used in combination with the device associated with the device image described above (for example, the multifunction machine B) with a frequency (for example, the number of times of use) equal to or more than a predetermined threshold. Accordingly, a device having a relatively high use frequency is provided to the user.

In addition, the controller 26 may preferentially display information on a device used with a relatively higher frequency in combination with the device associated with the device image described above (for example, the multifunction machine B), on the display unit of the UI unit 20.

(Modification 8)

Hereinafter, Modification 8 will be described. In Modification 8, plural operation assistants may be linked to each other. For example, the operation assistant stored in the terminal device 10 may share information (for example, information of a use history of a linkage function and information of a use history of a device) with an operation assistant stored in another terminal device. In this case, the specifying unit 28 may specify a linkage function by using the shared information which is acquired by the operation assistant, or recommend a device to be linked as in Modification 7. For example, the specifying unit 28 may specify a device capable of executing a linkage function in combination with a device transmitted by the user to the operation assistant, by using the information of the use history included in the shared information.

In addition, an operation assistant may be set for each user. In this case, plural operation assistants may be stored in the same terminal device 10. Each operation assistant may manage information on the user associated with the own operation assistant (for example, information of an operation history of the terminal device 10, information of a use history of a linkage function, and information of a use history of a device), and share the information with the other operation assistants. In this case, each operation assistant may recommend a device to be linked or recommend a linkage function by using the shared information.

(Modification 9)

Hereinafter, Modification 9 will be described. In Modification 9, information on devices to be linked is input to the terminal device 10 by voice. For example, when the user states names of devices to be linked (for example, the multifunction machine B and the PC A) by voice, the voice is input to the terminal device 10, and the specifying unit 28 (the specifying unit 28 implemented by the operation assistant) receives the voice input and specifies a linkage function. The information on the linkage function may be displayed on the display unit of the UI unit 20 or may be stated as voice information. When a voice input is used, the assistant image 50 may not be displayed on the display unit of the UI unit 20. In addition, when the assistant image 50 is displayed, the information on the devices may be input to the terminal device 10 by voice.

In addition, when a device image is moved to a specific area on the screen in a case where the assistant image 50 is not displayed, the device associated with the device image may be identified as a device to be linked.

(Modification 10)

Hereinafter, Modification 10 will be described. In Modification 10, when a device image (for example, the device image 52) is superimposed on the assistant image 50 for a predetermined time or longer, the specifying unit 28 identifies the device associated with the device image (for example, the multifunction machine B) as a device to be linked. When the length of a time for which the device image is superimposed is shorter than the predetermined time, the specifying unit 28 does not identify the device associated with the device image (for example, the multifunction machine B) as a device to be linked.

As another example, when the user designates a device image (for example, the device image 52), and then, traces from the device image to the assistant image 50 on the screen 48 by using a pointer to designate the assistant image 50 for a predetermined time or longer, the specifying unit 28 may identify the device associated with the device image (for example, the multifunction machine B) as a device to be linked. When the length of a time for which the assistant image 50 is designated is shorter than the predetermined time, the specifying unit 28 does not identify the device associated with the device image (for example, the multifunction machine B) as a device to be linked.

According to Modification 10, when the length of the time for which a device image is superimposed or designated is shorter than the predetermined time, the device associated with the device image is not identified as a device to be linked. Thus, a device which is not intended by the user is hardly identified as a device to be linked.

Second Exemplary Embodiment

Hereinafter, a device system according to a second exemplary embodiment will be described. In the above described first exemplary embodiment, when a device image associated with a device is connected to or superimposed on the assistant image 50, information on a linkage function is displayed. In the second exemplary embodiment, when a function image associated with a function is connected to or superimposed on the assistant image 50, information on a linkage function is displayed. The function image may be, for example, an image associated with software (for example, an application) or an image associated with a device by which a process is executed (a device existing in a real space). The function image is, for example, an image such as an icon and may be said as a virtual image which is distinguishable from an image representing the actual external appearance of a hardware device (for example, a photo) or an image representing a device itself. For example, when a function image associated with software is sent to the assistant image 50, information indicating a linkage function executable by using the software associated with the function image is displayed. Hereinafter, the second exemplary embodiment will be described in detail.

Figures 25, 26:
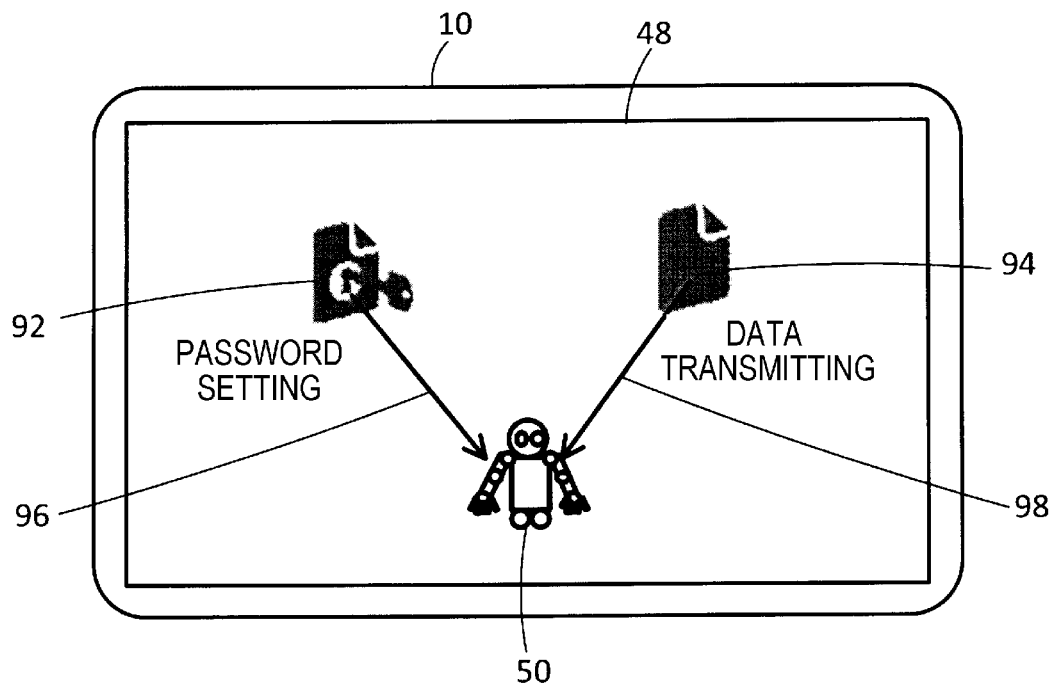
FIG. 25 is a view illustrating a linkage function management table according to a second exemplary embodiment.
FIG. 26 is a view illustrating a screen.

FIG. 25 illustrates an example of a linkage function management table according to the second exemplary embodiment. The linkage function management table is information indicating a linkage function executable by using plural functions. In the linkage function management table, for example, a function ID (for example, an ID for identifying software), information indicating a function name (for example, a software name), and information indicating a linkage function executable by using plural functions are associated with each other. A linkage function executable by using plural functions is specified by referring to the linkage function management table.

For example, software α as a function is software for transmitting data, and software β as a function is software for setting a password for data. For example, a linkage function of setting a password for data and then transmitting the data is implemented by combining the software α and the software β. Executable linkage functions are also set for other pieces of software.

In addition, a linkage function executable by using three or more functions (for example, pieces of software) may be set. In this case, the combination of the three or more functions and the linkage function are associated with each other, and the association is registered in the linkage function management table.

FIG. 26 illustrates the screen 48. The screen 48 displays one or plural function images. For example, the screen 48 displays function images associated with pieces of software installed in the terminal device 10. In the example illustrated in FIG. 26, function images 92 and 94 are displayed. Further, the screen 48 displays the assistant image 50 as in the first exemplary embodiment.

The function image 92 is an image associated with a password setting function (for example, an image associated with password setting software). When the user selects the function image 92 and gives an instruction to activate the password setting function, for example, the password setting software is activated, and a process of setting a password for data or the like is performed.

The function image 94 is an image associated with a data transmitting function (for example, an image associated with data transmitting software). When the user selects the function image 94 and gives an instruction to activate the data transmitting function, for example, the data transmitting software is activated, and data or the like to be transmitted is transmitted to a transmission destination.

As in the first exemplary embodiment, when the user connects plural function images to the assistant image 50 or superimposes plural function images on the assistant image 50, the specifying unit 28 identifies the functions of the plural respective function images, and specifies a linkage function executable by using the plural functions by referring to the linkage function management table illustrated in FIG. 25. The information indicating the linkage function is displayed on the display unit of the UI unit 20.

Figures 27, 28:
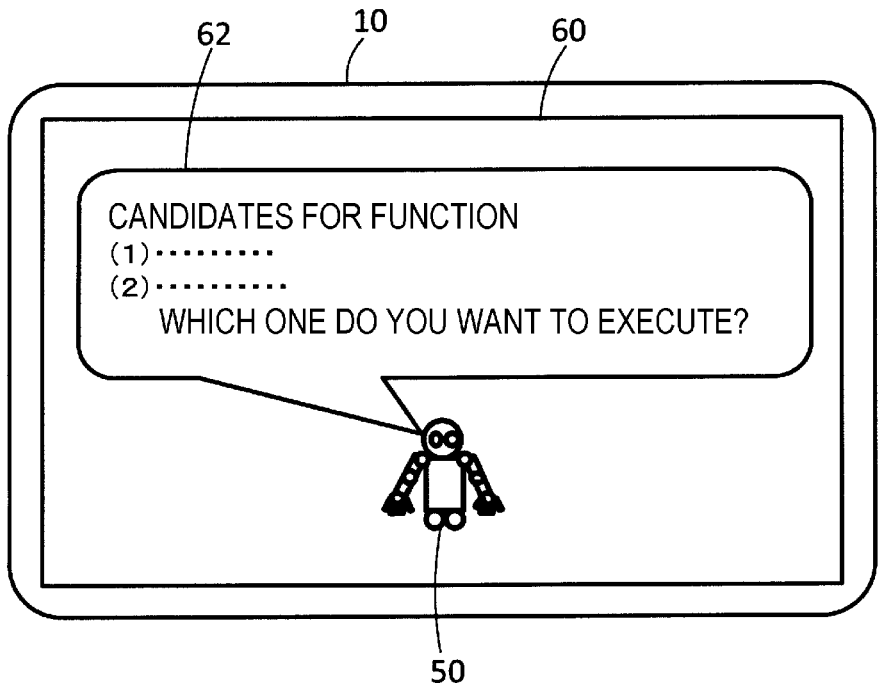
FIG. 27 is a view illustrating a screen.
FIG. 28 is a view illustrating a linkage function management table according to a third exemplary embodiment.

In the example illustrated in FIG. 26, when the user connects the function image 92 to the assistant image 50 as indicated by an arrow 96 and connects the function image 94 to the assistant image 50 as indicated by an arrow 98, information indicating linkage functions executable by using the password setting function and the data transmitting function is displayed. This process is also similarly applied to a case where the user superimposes the function images 92 and 94 on the assistant image 50. For example, as illustrated in FIG. 27, the screen 60 is displayed on the display unit of the UI unit 20, and information on the linkage functions specified as described above is displayed on the screen 60.

In addition, when three or more function images are sent to the assistant image 50, information indicating linkage functions executable by using the three or more functions may be displayed.

As described above, according to the second exemplary embodiment, information on a linkage function is provided when function images associated with functions to be linked are sent to the operation assistant (for example, when function images are connected to or superimposed on the assistant image 50). In this way, information on a linkage function is provided by the simple operation using the operation assistant.

In the second exemplary embodiment as well, when information of plural functions is transmitted to the operation assistant within a predetermined time limit, information on a linkage function executable by using the plural functions may be displayed, and when information on one function is transmitted to the operation assistant within the time limit, information on the function (a solo function) may be displayed, as in the first exemplary embodiment.

For example, in a case where the user does not connect an additional function image to the assistant image 50 within the time limit from a time point when the user connects the function image 92 to the assistant image 50, information on the function (a solo function) associated with the function image 92 is displayed. In a case where the user connects an additional function image (for example, the function image 94) to the assistant image 50 within the time limit, information on a linkage function executable by using the function associated with the function image 92 and the function associated with the function image 94 is displayed. This process is also similarly applied to a case where the operation to superimpose a function image on the assistant image 50 is performed.

By setting the time limit as described above, a switching is possible between providing a linkage function and providing a solo function in the second exemplary embodiment as well.

In addition, Modifications 1 to 10 of the first exemplary embodiment may be applied to the second exemplary embodiment.

For example, in a case where Modification 1 is applied, information on a linkage function may be displayed when function images are superimposed on the assistant image 50, or a composite image or a shortcut image may be generated as a result of the superimposing of plural function images.

As another example of the operation, plural function images may be selected by the user (for example, plural function images are selected by performing an operation to encircle the plural function images on the screen), and the plural function images may be collectively connected to or superimposed on the assistant image 50. By the operation as well, the functions associated with the plural function images, respectively, are identified as functions to be linked.

In addition, in a case where Modification 2 is applied, a display presentation may be executed such that a function image is sucked into the assistant image 50, or a display presentation may be executed such that a function image is ejected from the assistant image 50 when no executable linkage function exists.

In addition, in a case where Modification 3 is applied, the display of a linkage function may be controlled according to an order of connecting a function image to the assistant image 50 or superimposing a function image on the assistant image 50. In this case, in the linkage function management table according to the second exemplary embodiment as well, an access order and a priority of a function image are set as in the linkage function management table illustrated in FIG. 16.

In addition, as Modification 4 is applied, different functions may be assigned to respective portions in a function image. In this case, when portion images associated with functions are connected to or superimposed on the assistant image 50, information on a linkage function executable by using the functions associated with the portion images is displayed. In addition, a combination of Modifications 3 and 4 may be applied to the second exemplary embodiment.

In addition, in a case where Modification 5 is applied, the display of a linkage function may be controlled according to information obtained by the operation assistant. For example, the operation assistant may acquire information indicating a use history of a function, information indicating an execution status of software for implementing a function, information on the user (information indicating an operation history or a behavior history), and information indicating the user's schedule, by the learning function, and may control the display of a linkage function by using the pieces of information.

In addition, in a case where Modification 6 is applied, an operation assistant may be assigned to each function (for example, each piece of software), and an assistant image 50 associated with each function may be displayed on the display unit of the UI unit 20. Each operation assistant may manage the function (for example, software) assigned to the own operation assistant, or may create and issue a reply to a user's request regarding the function assigned to the own operation assistant. For example, the controller 26 changes information on a linkage function according to information shared by the plural operation assistants (for example, information on a use history or a state of software).

In addition, as Modification 7 is applied, a function to be linked may be recommended. For example, when the user connects a function image to the assistant image 50 or superimposes a function image to the assistant image 50, the specifying unit 28 identifies the function associated with the function image, and specifies a function capable of executing a linkage function in combination with the identified function by referring to the linkage function management table. In addition, the specifying unit 28 may recommend a function based on a use history of a linkage function, or may recommend a function having a relatively high use frequency.

In addition, in a case where Modification 8 is applied, a function to be used for a linkage function may be recommended based on information shared by the operation assistant with other operation assistants.

In addition, as Modification 9 is applied, information on functions to be linked may be input to the terminal device 10 by voice input.

In addition, in a case where Modification 10 is applied, when a function image is superimposed on the assistant image 50 for a predetermined time or longer, the function associated with the function image may be identified as a function to be linked. This process is also similarly applied to a case where the tracing on the screen 48 is performed by a pointer.

Third Exemplary Embodiment

Hereinafter, a device system according to a third exemplary embodiment will be described. The third exemplary embodiment corresponds to a combination of the first and second exemplary embodiments. That is, when a device image and a function image are sent to the assistant image 50 by the user, information on a linkage function executable by using the device associated with the device image and the function associated with the function image is displayed. Hereinafter, the third exemplary embodiment will be described in detail.

FIG. 28 illustrates an example of a linkage function management table according to the third exemplary embodiment. The linkage function management table is information indicating a linkage function executable by using a device and a function (for example, software). In the linkage function management table, for example, a combination of IDs (a combination of a device ID and a function ID), information indicating a device name and a function name, and a linkage function executable by using a device and a function are associated with each other. A linkage function executable by using a device and a function is specified by referring to the linkage function management table. For example, a linkage function of transmitting data by using the PC A is implemented by combining the PC A which is a device A and the data transmitting function which is a function α. Similarly, executable linkage functions are also set for other devices and other functions. In addition, a linkage function executable by using three or more devices and functions in total may be set. In this case, the combination of the three or more devices and functions and a linkage function are associated with each other, and the association is registered in the linkage function management table.

When the user connects a device image and a function image to the assistant image 50 or superimposes a device image and a function image on the assistant image 50, the specifying unit 28 specifies a linkage function associated with the combination of the device associated with the device image and the function associated with the function image by referring to the linkage function management table illustrated in FIG. 28. The information indicating the linkage function is displayed on the display unit of the UI unit 20. In addition, when one or plural device images and one or plural function images are connected to or superimposed on the assistant image 50, information indicating a linkage function executable by using the one or plural devices and the one or plural functions may be displayed.

Figure 29:
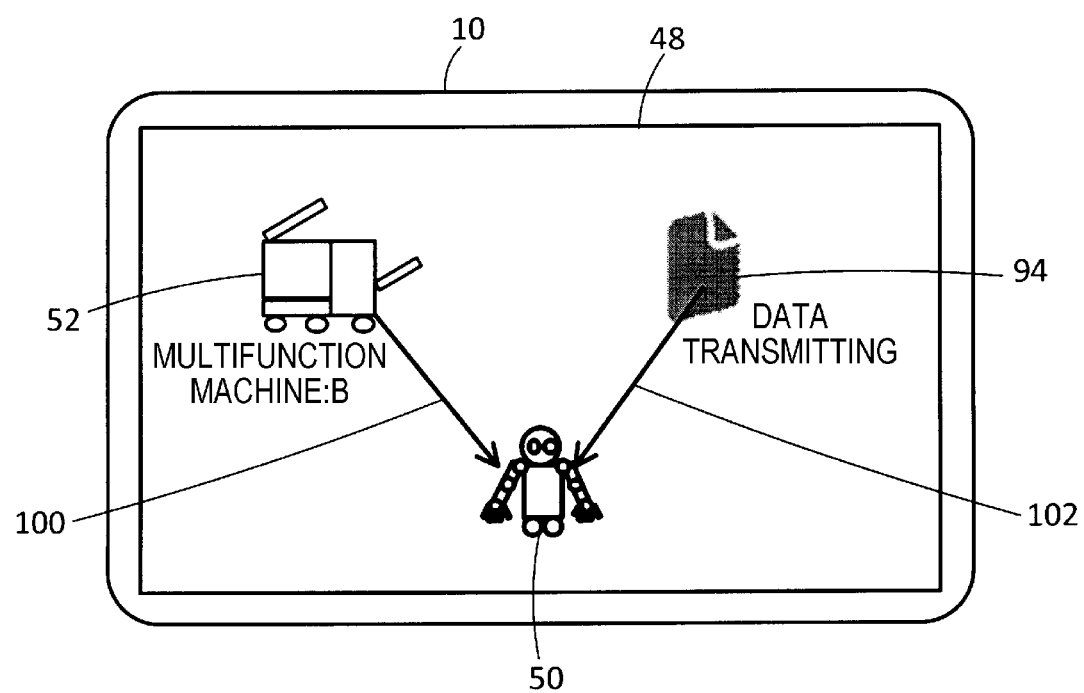
FIG. 29 is a view illustrating a screen.

FIG. 29 illustrates the screen 48. For example, the screen 48 displays the device image 52 and the function image 94. The device image 52 is an image associated with the multifunction machine B, and the function image 94 is an image associated with the data transmitting function (for example, data transmitting software). For example, when the multifunction machine B is identified by, for example, the AR technique described above, the device image 52 associated with the multifunction machine B is displayed on the screen 48. Further, when the data transmitting software a is installed in the terminal device 10, the function image 94 associated with the data transmitting software a is displayed on the screen 48.

For example, when the user connects the device image 52 to the assistant image 50 as indicated by an arrow 100 and connects the function image 94 to the assistant image 50 as indicated by an arrow 102, the specifying unit 28 identifies the multifunction machine B associated with the device image 52 as a device to be linked, and identifies the data transmitting software a associated with the function image 94 as a function to be linked. Then, the specifying unit 28 specifies a linkage function executable by using the multifunction machine B and the data transmitting software a by referring to the linkage function management table illustrated in FIG. 28. The information indicating the linkage function is displayed on the display unit of the UI unit 20. This process is also similarly applied to a case where the device image 52 and the function image 94 are superimposed on the assistant image 50. In addition, the order of connecting the device image 52 and the function image 94 to the assistant image 50 or superimposing the device image 52 and the function image 94 on the assistant image 50 may be reversed.

In addition, when three or more device images and function images in total are sent to the assistant image 50, information indicating a linkage function executable by using the three or more device images and function images may be displayed.

As described above, according to the third exemplary embodiment, information on a linkage function is provided when a device image and a function image are sent to the operation assistant. In this way, information on a linkage function is provided by the simple operation using the operation assistant.

In addition, when an image (for example, an icon) associated with data (also referred to as a file) is superimposed on a device image, the controller 26 may register the data as an object to be processed by the device associated with the device image. When the user gives an instruction to execute the process, the device executes the process designated by the user on the registered data. The data is, for example, document data or image data. For example, when document data is superimposed on a device image associated with a multifunction machine, the document data is registered as an object to be processed by the multifunction machine. When the user gives a printing instruction to the multifunction machine, the registered document data is printed by the multifunction machine. In addition, this process may also be executed in the first exemplary embodiment.

In addition, when an image associated with data is superimposed on a function image, the controller 26 may register the data as an object to be processed by the function associated with the function image. When the user gives an instruction to execute the process, the process by the function is executed on the registered data. For example, when document data is superimposed on a function image associated with data transmitting software, the document data is registered as an object to be transmitted. When the user gives a transmitting instruction, the registered document data is transmitted to a reception destination. This process may also be executed in the second exemplary embodiment.

In addition, when an image associated with data is superimposed on a device image and registered as an object to be processed, and thereafter, the device image and a function image are connected to or superimposed on the assistant image 50, the controller 26 registers the data as an object to be processed by a linkage function executable by using the device associated with the device image and the function associated with the function image. Similarly, when an image associated with data is superimposed on a function image and registered as an object to be processed, and thereafter, the function image and a device image are connected to or superimposed on the assistant image 50, the controller 26 registers the data as an object to be processed by a linkage function executable by using the function associated with the function image and the device associated with the device image. When the user gives an instruction to execute the linkage function, the process by the linkage function is executed on the registered data.

In the third exemplary embodiment as well, when information on a device and information on a function are transmitted to the operation assistant within the predetermined time limit, information on a linkage function executable by using the device and the function may be displayed, and when information on one device or one function is transmitted to the operation assistant within the time limit, information on a solo function that the device has or the function may be displayed, as in the first exemplary embodiment.

For example, in a case where the user does not connect a function image to the assistant image 50 within the time limit from a time point when the user connects the device image 52 to the assistant image 50, information on the function (a solo function) associated with the device image 52 is displayed. When the user connects a function image (for example, the function image 94) to the assistant image 50 within the time limit, information on a linkage function executable by using the device associated with the device image 52 and the function associated with the function image 94 is displayed. This process is also similarly applied to a case where the function image 94 is first connected to the assistant image 50. Further, the process is also similarly applied to a case where the operation to superimpose a device image or a function image on the assistant image 50 is performed.

By providing the time limit as described above, switching between providing a linkage function or providing a solo function is possible in the third exemplary embodiment as well.

In addition, Modifications 1 to 10 of the first exemplary embodiment may also be applied to the third exemplary embodiment.

For example, in a case where Modification 1 is applied, information on a linkage function may be displayed when a device image and a function image are superimposed on the assistant image 50, or a composite image or a shortcut image may be generated as a result of the superimposing of the device image and the function image.

As another example of the operation, a device image and a function image may be selected by the user (for example, a device image and a function image are selected by an operation to encircle the device image and the function image on the screen), and the device image and the function image may be collectively connected to or superimposed on the assistant image 50. By the operation as well, the device associated with the device image and the function associated with the function image are identified as objects to be linked.

In addition, in a case where Modification 2 is applied, a display presentation may be executed such that a device image or a function image is sucked into the assistant image 50, or a display presentation may be executed such that a device image or a function image is ejected from the assistant image 50 when no executable linkage function exists.

In addition, in a case where Modification 3 is applied, the display of a linkage function may be controlled according to an order of connecting a device image or a function image to the assistant image 50 or superimposing a device image or a function image on the assistant image 50. In this case, in the linkage function management table according to the third exemplary embodiment, access orders and priorities of a device image and a function image are set as in the linkage function management table illustrated in FIG. 16.

In addition, in a case where Modification 4 is applied, portion images associated with portions in device images may be connected to or superimposed on the assistant image 50. In this case, information on a linkage function executable by using the portions associated with the portion images is displayed. In addition, a combination of Modifications 3 and 4 may be applied to the third exemplary embodiment. In addition, when a function is further assigned to each portion in a function image, the portion image associated with the portion may be connected to or superimposed on the assistant image 50.

In addition, in a case where Modification 5 is applied, the display of a linkage function may be controlled according to information obtained by the operation assistant. For example, the operation assistant may acquire information indicating a use history of a device or a function, information indicating an execution status of a device, information indicating an execution status of software for implementing a function, information on the user (information indicating an operation history or a behavior history), and information indicating the user's schedule, by the learning function, and may control the display of a linkage function by using the pieces of information.

In addition, in a case where Modification 6 is applied, an operation assistant may be assigned to each device or function (for example, each piece of software), and an assistant image 50 associated with each device and an assistant image 50 associated with each function may be displayed on the display unit of the UI unit 20. Each operation assistant may manage the device or the function (for example, software) assigned to the own operation assistant, or may create and issue a reply to a user's request regarding the device or the function assigned to the own operation assistant. For example, the controller 26 changes information on a linkage function according to information shared by the plural operation assistants (for example, information on a use history or a state of a device or software).

In addition, when Modification 7 is applied, a device or a function to be linked may be recommended. For example, when the user connects a device image or a function image to the assistant image 50 or superimposes a device image or a function image on the assistant image 50, the specifying unit 28 may specify a function capable of executing a linkage function in combination with the device associated with the device image or a device capable of executing a linkage function in combination with the function associated with the function image, by referring to the linkage function management table. In addition, the specifying unit 28 may recommend a device or a function based on a use history of a linkage function, or may recommend a device or a function having a relatively high use frequency.

In addition, in a case where Modification 8 is applied, a device or a function to be used for a linkage function may be recommended based on information shared by the operation assistant with other operation assistants.

In addition, as Modification 9 is applied, information on a device and a function to be linked may be input to the terminal device 10 by voice input.

In addition, in a case where Modification 10 is applied, when a device image or a function image is superimposed on the assistant image 50 for a predetermined time or longer, the device associated with the device image or the function associated with the function image may be identified as a device or function to be linked. This process is also similarly applied to a case where the tracing on the screen 48 is performed by a pointer.

Fourth Exemplary Embodiment

Hereinafter, a device system according to a fourth exemplary embodiment will be described. In the fourth exemplary embodiment, when a file (data) is transmitted to the operation assistant, information on a linkage function according to the file is displayed. Hereinafter, the fourth exemplary embodiment will be described in detail.

The linkage function management information according to the fourth exemplary embodiment is information for managing a linkage function that is executed by linking plural functions to each other. The linkage function is a function implemented by linking plural pieces of software to each other. In addition, the linkage function may be a function implemented by linking a function that a hardware device has and a function implemented by software to each other.

The linkage function according to the fourth exemplary embodiment will be described in more detail. The linkage function is a function executed on plural files (data) when the user selects the plural files. For example, each file is associated with software (application) for executing a process on the file. The linkage function is implemented by linking applications associated with respective plural files selected by the user to each other.

The files are, for example, a document file, an image file, a video file, a spreadsheet file, a presentation file, a graphic (drawing) file, and an audio file.

The document file is a file having a document format and is configured with character strings or other pieces of information. The document file may contain images, tables, or figures as other pieces of information. The document format is, for example, a text format or a document format. The document file corresponds to, for example, data having a text format (for example, data appended with a character string ".txt" as an extension) or data having a document format (for example, data appended with a character string ".doc" or ".docx" as an extension).

The image file is a file having an image format. The image file may be image data having a raster format or image data having a vector format. The image format is, for example, a JPEG format, a BMP (bitmap) format, a PDF format, a GIF format, a TIFF format, a PNG format, or a PICT format. The image file corresponds to, for example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), or data having a PICT format (data appended with a character string ".pict" as an extension). In addition, image data having a format other than the formats described above may be used as the image file according to the fourth exemplary embodiment.

The video file is a file having a video format. The video format is, for example, an AVI format, an MP4 format, an MOV format, an MPEG2-TS format, an MPEG2-PS format, a WMV format, or an FLV format. The video file corresponds to, for example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), or data having an FLV format (data appended with a character string ".flv"). In addition, video data having a format other than the formats described above may be used as the video file according to the fourth exemplary embodiment.

The spreadsheet file is a file having a table format and is configured with tables, graphs, or other pieces of information. The spreadsheet file may contain character strings, images, or figures as other pieces of information. For example, the spreadsheet file is data appended with a character string ".csv," ".xls" or ".xlsx" as an extension.

The presentation file is a file having a presentation sheet format. For example, the presentation file corresponds to data appended with a character string ".ppt" or ".pptx" as an extension. The presentation file is configured with, for example, character strings, images (still images or video), figures, and voice.

The graphic file is a file having a graphic (drawing) format. The graphic file is created by, for example, graphic generating software (for example, two-dimensional CAD or three-dimensional CAD). For example, the graphic file corresponds to data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (for example, a WAV format, an AIFF format, or a BWF format), an irreversible compressed audio format (for example, an mp3 format, an AAC format, or a WMA format), or a reversible compressed audio format (for example, a TAK format or an FLAC format). For example, the audio file corresponds to data having an uncompressed audio format (data appended with, for example, a character string ".wav" as an extension), data having an irreversible compressed audio format (data appended with, for example, a character string ".mp3" as extension), or data having an uncompressed audio format (data appended with, for example, a character string ".tak" as an extension).

In the fourth exemplary embodiment, a linkage function is set for each file format (attribute), and the linkage function management information is, for example, information indicating an association between information indicating a combination of plural file formats and information indicating a linkage function (linkage function information). The linkage function information is, for example, a linkage function ID or a linkage function name. The file format is, for example, the above-described document format, image format, video format, table format, sheet format, graphic format, or audio format. A linkage function associated with the combination of the plural file formats is specified (identified) by referring to the linkage function management information.

The linkage function may be a function implemented by linking plural different functions (for example, different pieces of software) to each other or a function implemented by linking identical functions (for example, identical pieces of software) to each other. The linkage function may be a function which is unusable before the linkage. A function which is unusable before linkage may become usable by linking identical functions to each other, or become usable by combining different functions to each other. For example, when a document creating function (document creating software) and an image displaying function (image displaying software (for example, an image viewer)) are linked to each other, a function of inserting (adding) an image into a document or a function of superimposing a document (character strings or texts) on an image is implemented as a linkage function. That is, when the document creating function and the image displaying function are linked to each other, an image inserting function or a text superimposing function is implemented.

The concept of the linkage function may include a coalescing function executable as a new function by combining plural functions with each other. For example, an extended displaying function may be implemented as the coalescing function by combining plural displaying functions. In addition, a capturing area expanding function may be implemented as the coalescing function by combining plural capturing functions. In addition, a translated call function (a function of translating a phone conversation) may be implemented as the coalescing function by combining a call function and a translation function. As described above, the concept of the linkage function may include a function which may be implemented by linking identical types of functions to each other, or a function which may be implemented by linking different types of functions to each other.

A linkage function managed by the linkage function management information may be a function executable by pieces of software installed in the terminal device 10, a function executable by pieces of software installed in an external device (for example, the server or another terminal device), or a function executable by software installed in the terminal device 10 and software installed in an external device.

In addition, as another example of the linkage function management information, information indicating a combination of plural functions (plural pieces of software), and information indicating a linkage function executable by linking the plural functions to each other (linkage function information) may be associated with each other.

When images associated with plural files, respectively, are connected to or superimposed on the assistant image 50, the specifying unit 28 specifies a linkage function associated with the combination of the formats (file formats) of the plural files in the linkage function management table. Accordingly, a linkage function executable when plural files are transmitted to the operation assistant is specified.

Hereinafter, linkage function management information according to the fourth exemplary embodiment will be described in detail with reference to FIG. 30. FIG. 30 illustrates an example of a linkage function management table according to the fourth exemplary embodiment. In the linkage function management table, for example, information indicating a combination of plural file formats and information indicating a linkage function (linkage function information) are associated with each other. For example, when the user transmits plural files to the operation assistant, the specifying unit 28 specifies a linkage function associated with the combination of the file formats of the plural files in the linkage function management table. The information on the linkage function is displayed on the display unit of the UI unit 20. In addition, while FIG. 30 illustrates a combination of two file formats, an association between a combination of three or more file formats and a linkage function may be registered in the linkage function management table.

Hereinafter, each linkage function illustrated in FIG. 30 will be described. In FIG. 30, the "document format" is a text format (having an extension of ".txt") or a document format (having an extension of ".doc" or ".docx"). The "table format" is a format with an extension expressed as, for example, ".csv" or ".xls." The "image format" is a format with an extension expressed as, for example, ".jpeg" or ".pdf." The "video format" is a format with an extension expressed as, for example, ".avi" or ".mpeg." The "sheet format" is a format with an extension expressed as, for example, ".ppt." While FIG. 30 does not illustrate the graphic format or the audio format, an association between a combination of file formats including the graphic format and the audio format and a linkage function may be registered in the linkage function management table. In addition, an association between a combination of file formats other than the file formats illustrated in FIG. 30 and a linkage function may be set and registered in the linkage function management table.

Hereinafter, each linkage function illustrated in FIG. 30 will be described. When the user transmits a document file A and a spreadsheet file B to the operation assistant, a "function of inserting a table into a document" and a "function of inserting a document into a table" which are associated with the combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When the user transmits the document file A and an image file C to the operation assistant, a "function of inserting an image into a document" and a "function of superimposing a document on an image" which are associated with the combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When the user transmits the document file A and a video file D to the operation assistant, a "function of inserting a video into a document" and a "function of inserting a still image into a document" which are associated with the combination of the document format and the video format are specified as linkage functions. The "function of inserting a video into a document" is a function of inserting the video represented by the video file D into the document represented by the document file A. The "function of inserting a still image into a document" is a function of inserting one or plural frames (still images) included in the video file D into the document represented by the document file A. For example, when the document file A is a document file which is not compatible with a video, that is, a file into which a video cannot be inserted and when the "function of inserting a still image into a document" is executed, one or plural frames (still images) included in the video file D are inserted into the document represented by the document file A.

Plural files having the same file format may be selected by the user. For example, when the user transmits document files A1 and A2 to the operation assistant, a "function of integrating documents" which is associated with the combination of the document formats is specified as a linkage function. The "function of integrating documents" is a function of integrating the documents represented by the document files A1 and A2 with each other (for example, combining the two documents with each other), and generates a new document file A3 while saving or removing the document files A1 and A2.

When the user transmits spreadsheet files B1 and B2 to the operation assistant, a "function of integrating tables" which is associated with the combination of the table formats is specified as a linkage function. The "function of integrating tables" is a function of integrating the tables represented by the spreadsheet files B1 and B2 with each other (for example, combining the two tables with each other), and generates a new spreadsheet file B3 while saving or removing the spreadsheet files B1 and B2.

When the user transmits video files D1 and D2 to the operation assistant, a "function of integrating videos" which is associated with the combination of the video formats is specified as a linkage function. The "function of integrating videos" is a function of integrating the videos represented by the video files D1 and D2 with each other (for example, combining the two videos with each other), and generates a new video file D3 while saving or removing the video files D1 and D2.

In addition, when the user transmits a presentation file E and the document file A to the operation assistant, a "function of inserting a document into a presentation sheet" which is associated with the combination of the sheet format and the document format is specified as a linkage function. The "function of inserting a document into a presentation sheet" is a function of inserting the document represented by the document file A into the sheet represented by the presentation file E.

The operation of the terminal device 10 according to the fourth exemplary embodiment will be described in detail.

Figure 31:
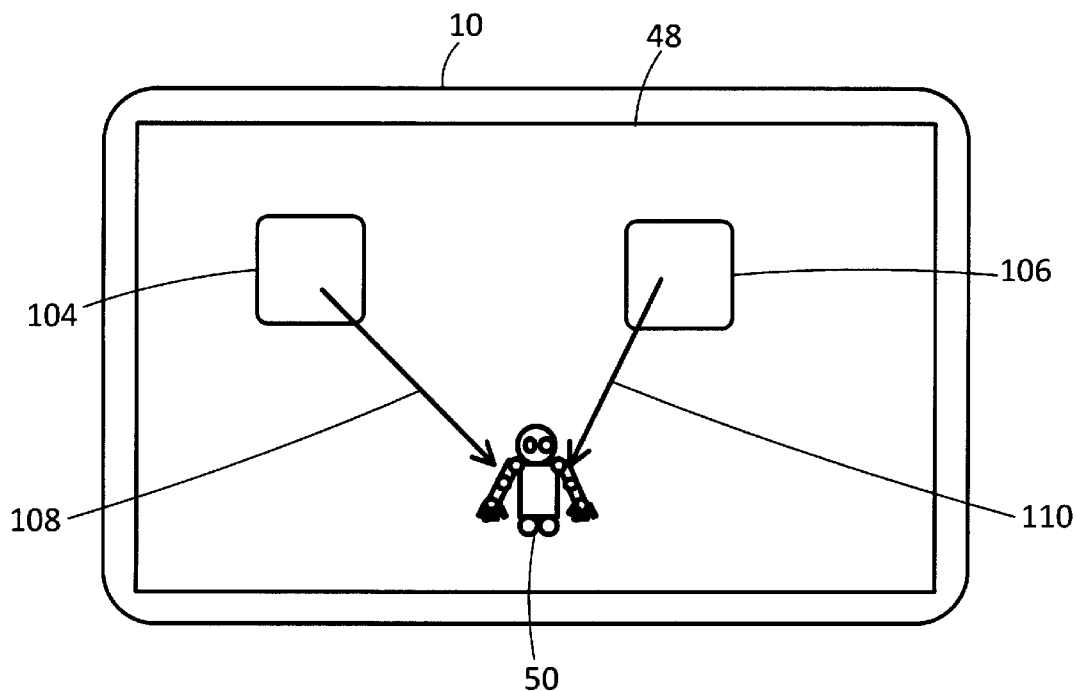
FIG. 31 is a view illustrating a screen.

FIG. 31 illustrates the screen 48. The screen 48 displays images (for example, icons) associated with various files or images (for example, icons) associated with various pieces of software.

In the example illustrated in FIG. 31, the screen 48 displays a file image 104 associated with the document file A and a file image 106 associated with the image file C. Further, the screen 48 displays the assistant image 50 associated with the operation assistant.

For example, when the user connects the file image 104 to the assistant image 50 as indicated by an arrow 108 and connects the file image 106 to the assistant image 50 as indicated by an arrow 110, the specifying unit 28 identifies the document file A associated with the file image 104 and the image file C associated with the file image 106 as files to be linked. Further, the specifying unit 28 identifies the file format of the document file A based on the extension of the document file A (for example, the extension associated with the document file A which is attribute information of the document file A). Similarly, the specifying unit 28 identifies the file format of the image file C based on the extension of the image file C (the extension appended to the image file C as, for example, attribute information of the image file C). In addition, the extension may be included in a file name. When the extension of the document file A corresponds to an extension representing the document format such as ".txt" or ".docx," the specifying unit 28 identifies that the file format of the document file A is the document format. When the extension of the image file C corresponds to an extension representing the image format such as ".jpeg," the specifying unit 28 identifies that the file format of the image file C is the image format. Then, the specifying unit 28 specifies linkage functions (the "function of inserting an image into a document" and the "function of superimposing a document on an image") associated with the combination of the document format and the image format in the linkage function management table illustrated in FIG. 30. The information on the linkage function is displayed on the display unit of the UI unit 20. This process is also similarly applied to a case where the file images 104 and 106 are superimposed on the assistant image 50. In addition, the order of connecting the file images 104 and 106 to the assistant image 50 or superimposing the file images 104 and 106 on the assistant image 50 may be reversed to that described above.

In addition, when three or more file images are sent to the assistant image 50, information on a linkage function associated with the combination of the three or more file formats may be displayed.

Figure 32:
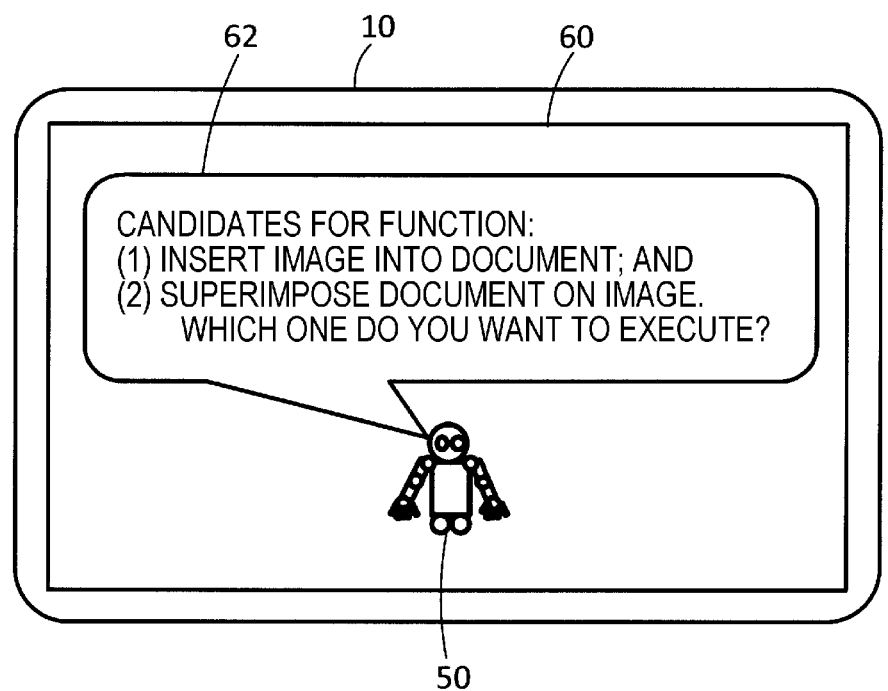
FIG. 32 is a view illustrating a screen.

FIG. 32 illustrates an example of the display of the linkage functions. The screen 60 displays information indicating the linkage functions specified by the specifying unit 28. In the example described above, the screen 60 displays information indicating the "function of inserting an image into a document" and the "function of superimposing a document on an image," as linkage functions.

When the user designates a linkage function and gives an instruction to execute the linkage function on the screen 60, the controller 26 executes the designated linkage function. For example, when the user gives an instruction to execute the "function of inserting an image into a document," the controller 26 inserts the image represented by the image file C into the document represented by the document file A.

More specifically, the controller 26 activates a document application and an image application. The document application is software (program) having a function of creating, editing, and displaying a file having the document format. The image application is software (program) having a function of creating, editing, and displaying a file having the image format. In addition, the document application may be associated in advance with the document file A, and the image application may be associated in advance with the image file C. The controller 26 copies the image of the image file C by using the function that the image application has, and pastes the image into the document represented by the document file A by using the function that the document application has. Accordingly, the document into which the image has been inserted is generated. In addition, the controller 26 may extract a portion image representing a specific portion from the image represented by the image file C by using the function of the image application, and paste the portion image into the document. In the document, the area where the image is pasted may be a predetermined area, an area designated by the user, or an area presumed to describe a character string related to the image. For example, the controller 26 presumes or searches for a character string expressing a feature portion represented in the image, and presumes that, in the document, an area describing a character string having the same or similar meaning to the searched character string is an area describing the character string related to the image. In addition, the area may be presumed by another method.

Similarly, when the user gives an instruction to execute the "function of superimposing a document on an image," all or some parts of the document represented by the document file A are copied by the function that the document application has, and the copied document is superimposed on the image represented by the image file C. The portion to be copied from the document may be determined in advance or designated by the user. In addition, the portion of the image where the document is to be superimposed may be determined in advance, or designated by the user.

The controller 26 may generate a new file by executing a linkage function. In this case, the plural files themselves selected as objects to be linked are not edited. For example, when the document file A and the image file C are selected as files to be linked, and an instruction to execute the "function of inserting an image into a document" is given, the controller 26 generates a new document file AC by pasting the image represented by the image file C into the document represented by the document file A. In this case, the controller 26 generates a new file image (for example, an icon) associated with the document file AC and displays the file image on the screen 48. In this case, the document file A and the image file C themselves are not edited, and the file images 104 and 106 are displayed on the screen 48.

Similarly, when an instruction to execute the "function of superimposing a document on an image" is given, the controller 26 generates a new image file CA by superimposing all or some parts of the document represented by the document file A on the image represented by the image file C, and generates a new image associated with the image file CA. The new image is displayed on the screen 48. In this case as well, the document file A and the image file C themselves are not edited, and the file images 104 and 106 are displayed on the screen 48.

As another example, the controller 26 may execute the linkage function to thereby edit (including, for example, process) the files themselves selected as objects to be linked, without generating a new file. Referring to the example described above, the controller 26 pastes the image represented by the image file C into the document represented by the document file A, and saves the document file in which the pasting of the image has been reflected, as the document file A. In this case, the document file A is updated.

As described above, according to the fourth exemplary embodiment, information on a linkage function is displayed when file images are sent to the operation assistant. In this way, information on a linkage function is provided by the simple operation using the operation assistant.

In the fourth exemplary embodiment, the display of information on a linkage function, or a linkage function to be executed may be changed according to a master-servant relationship of files. For example, a file of which represented contents themselves are editable corresponds to a master file, and a file of which contents themselves are not editable corresponds to a servant file. For example, when a document itself represented in a document file is editable, the document file corresponds to the master file. In addition, when an image itself represented in an image file is not editable (that is, when contents may be superimposed on an image, but the image itself is not editable), the image file corresponds to the servant file. This relationship is similarly applied to other files. In addition, a document file also corresponds to the servant file when the document of the document file is not editable, and an image file also corresponds to the master file when the image of the image file is editable.

The specifying unit 28 may determine whether a file corresponds to the master file or the servant file, based on a file format (that is, an extension). For example, the specifying unit 28 may determine that a file having the document format, a file having the table format, a file having the sheet format, and a file having the graphic format correspond to master files, and a file having the image format, a file having the video format, and a file having the audio format correspond to servant files. In addition, whether a file corresponds to the master file or the servant file may not be determined by collectively determining the file formats, and may be determined by individually determining files selected as objects to be linked. For example, even a file having the image format may correspond to the master file when the image of the file is editable.

For example, when the file image 104 associated with the document file A and the file image 106 associated with the image file C are connected to or superimposed on the assistant image 50, the specifying unit 28 determines whether the document file A corresponds to the master file or the servant file, based on the extension associated with the document file A, and determines whether the image file C corresponds to the master file or the servant file, based on the extension associated with the image file C. It is assumed that the extension of the document file A is, for example, ".docx," and the extension of the image file C is, for example, ".jpeg." In this case, since the document file A has the document format and is editable, the specifying unit 28 determines that the document file A corresponds to the master file. Further, since the image file C has the image format and is not editable, the specifying unit 28 determines that the image file C corresponds to the servant file. In addition, the specifying unit 28 may determine whether the document file A and the image file C are editable, by individually determining the document file A and the image file C, rather than the determination based on the extensions.

Since the document file A corresponds to the master file and the image file C corresponds to the servant file, the image represented in the image file C corresponds to a content to be pasted, and the document represented in the document file A corresponds to a content of a place where the image is to be pasted. In this case, the specifying unit 28 specifies the "function of inserting an image into a document" as a linkage function. The controller 26 displays the information on the "function of inserting an image into a document" on the display unit of the UI unit 20. When plural linkage functions are specified by the specifying unit 28, the controller 26 displays the information on the plural linkage functions on the display unit of the UI unit 20.

In addition, the controller 26 may cause the display unit of the UI unit 20 to display information on a linkage function specified based on the master-servant relationship of files, from the plural linkage functions registered in the linkage function management table illustrated in FIG. 30, in preference to the information on the other linkage function. Referring to the example where the document file A and the image file C are transmitted, the "function of inserting an image into a document" and the "function of superimposing a document on an image" are registered as linkage functions associated with the combination of the document format and the image format in the linkage function management table (see FIG. 30). In this case, the specifying unit 28 specifies the "function of inserting an image into a document" which is specified based on the master-servant relationship of files as a linkage function having a "first priority," and specifies the "function of superimposing a document on an image" as a linkage function having a "second priority." The controller 26 causes the display unit of the UI unit 20 to display the information on the "function of inserting an image into a document" in preference to (for example, at a higher rank) the information on the "function of superimposing a document on an image" according to the priorities.

In addition, when plural linkage functions are specified based on the master-servant relationship of the files, the controller 26 may determine priorities of the respective linkage functions based on a history of use of each linkage function by the user, and cause the display unit of the UI unit 20 to display the information on the linkage functions according to the priorities of the linkage functions. For example, the controller 26 preferentially displays information on a linkage function having a relatively high use frequency on the display unit of the UI unit 20 (for example, at a higher rank).

In addition, when plural linkage functions are specified based on the master-servant relationship of files, the controller 26 may determine priorities of the respective linkage functions based on a relationship of plural files selected as objects to be linked (that is, a relationship of plural file formats), and display the information on the linkage functions according to the priorities of the linkage functions on the display unit of the UI unit 20. For example, the controller 26 determines a degree of the likelihood that each linkage function included in the plural linkage functions specified by the specifying unit 28 is to be used, based on plural file formats. The controller 26 preferentially displays information on a linkage function having a relatively high use likelihood on the display unit of the UI unit 20 (for example, at a higher rank). For example, in the combination of the document format and the image format, it is predicted that the use likelihood of the "function of inserting an image into a document" is higher than that of the "function of superimposing a document on an image." In this case, the controller 26 displays the information on the "function of inserting an image into a document" on the display unit of the UI unit 20, in preference to the information on the "function of superimposing a document on an image".

In addition, in the fourth exemplary embodiment as well, when information of plural files is transmitted to the operation assistant within the predetermined time limit, information on a linkage function associated with the formats of the plural files may be displayed, and when information of one file is transmitted to the operation assistant within the time limit, information on the function associated with the file (for example, information on software) may be displayed, as in the first exemplary embodiment.

For example, in a case where the user does not connect an additional file image to the assistant image 50 within the time limit from a time point when the user connects the file image 104 to the assistant image 50, information on the function (software) associated with the file image 104 may be displayed, or the software may be activated. In a case where the user connects an additional file image (for example, the file image 106) to the assistant image 50 within the time limit, information on a linkage function associated with the combination of the file format associated with the file image 104 and the file format associated with the file image 106 is displayed. This process is also similarly applied to a case where the operation to superimpose file images on the assistant image 50 is performed.

By providing the time limit as described above, switching between providing a linkage function and providing a solo function is possible in the fourth exemplary embodiment as well.

In addition, Modifications 1 to 10 of the first exemplary embodiment may be applied to the fourth exemplary embodiment as well.

For example, in a case where Modification 1 is applied, information on a linkage function may be displayed when file images are superimposed on the assistant image 50, or a composite image may be generated as a result of the superimposing of the plural file images.

As another example of the operation, plural file images may be selected by the user (for example, plural file images are selected by performing an operation to encircle the plural file images on the screen), and the plural file images may be collectively connected to or superimposed on the assistant image 50. By the operation as well, the files associated with the plural file images, respectively, are identified as files to be linked.

In addition, in a case where Modification 2 is applied, a display presentation may be executed such that a file image is sucked into the assistant image 50, or a display presentation may be executed such that a file image is ejected from the assistant image 50 when no executable linkage function exists.

In addition, in a case where Modification 3 is applied, the display of a linkage function may be controlled according to an order of connecting a file image to the assistant image 50 or superimposing a file image on the assistant image 50. In this case, in the linkage function management table according to the fourth exemplary embodiment as well, an access order and a priority of a file image are set as in the linkage function management table illustrated in FIG. 16.

In addition, in a case where Modification 4 is applied, different functions may be further assigned to the respective portions in a file image. In this case, when portion images are connected to or superimposed on the assistant image 50, information on a linkage function executable by using the functions associated with the portion images is displayed. In addition, a combination of Modifications 3 and 4 may be applied to the fourth exemplary embodiment.

In addition, in a case where Modification 5 is applied, the display of a linkage function may be controlled according to information obtained by the operation assistant. For example, the operation assistant may acquire information indicating a use history of a file, information indicating an execution status of software, information on the user (information indicating an operation history or a behavior history), and information indicating the user's schedule, by the learning function, and may control the display of a linkage function by using the pieces of information.

In addition, in a case where Modification 6 is applied, an operation assistant may be assigned to each file (for example, each piece of software), and an assistant image 50 associated with each file may be displayed on the display unit of the UI unit 20. Each operation assistant may manage the file (for example, software) assigned to the own operation assistant, or may create and issue a reply to a user's request regarding the file assigned to the own operation assistant. For example, the controller 26 changes information on a linkage function according to information shared by the plural operation assistants (for example, information on a use history or a state of software).

In addition, in a case where Modification 7 is applied, a file to be linked may be recommended. For example, when the user connects a file image to the assistant image 50 or superimposes a file image on the assistant image 50, the specifying unit 28 may specify a file (or a file format) capable of executing a linkage function in combination with the file associated with the file image by referring to the linkage function management table. In addition, the specifying unit 28 may recommend a file (or a file format) based on a use history of a linkage function or recommend a file (or a file format) or a function having a relatively high use frequency.

In addition, in a case where Modification 8 is applied, a file (or a file format) to be used for a linkage function may be recommended based on information shared by the operation assistant with other operation assistants.

In addition, in a case where Modification 9 is applied, information on a file to be linked may be input to the terminal device 10 in the form of a voice input.

In addition, in a case where Modification 10 is applied, when file images are superimposed on the assistant image 50 for a predetermined time or longer, the files associated with the files images may be identified as files to be linked. This process is also similarly applied to a case where the tracing on the screen 48 is performed by a pointer.

In the fourth exemplary embodiment, the specifying unit 28 may specify a linkage function according to names of plural files (file names) sent as objects to be linked to the operation assistant. To this end, a combination of the file names and a linkage function are associated with each other in the linkage function management table, and the specifying unit 28 specifies the linkage function associated with the combination of the file names sent to the operation assistant by referring to the linkage function management table.

In addition, the specifying unit 28 may specify a file to which a content is to be added, based on a name of a file sent to the operation assistant. For example, when a name of a file (file name) transmitted to the operation assistant includes a character string suggesting a file for collecting data (that is, a file assumed or predicted to incorporate a content of other data), such as "ledger," "collection," "management," "statistics," "graph," "table," or "list," the specifying unit 28 identifies the file as a file to which a content is to be added (corresponding to a second file). In addition, the specifying unit 28 identifies a file having a file name including no character string for the collection or a file having a file name including a character string suggesting a file for providing a content (material), as a file containing a content (material) to be added (corresponding to a first file). For example, a file having a file name including a character string such as "receipt," "slip," "personal data," and "device data" does not correspond to a file for the collection and is determined to correspond to a file for providing a content (material).

For example, when the document files A1 and A2 are sent as files to be linked to the operation assistant, in a case where the document file A1 has a file name including a character string for the collection, and the document file A2 has a file name including a character string for providing a material without including the character string for the collection, the specifying unit 28 specifies a linkage function to perform, for example, input, copying, and a statistical process from the document file A2 for providing a material to the document file A1 for the collection, as a preferential linkage function. The controller 26 displays the preferential linkage function on the UI unit 20 in preference to the other linkage function.

In addition, the combination of objects to be linked is not limited to the combinations in the first to fourth exemplary embodiments. For example, when a combination of at least two of a device, a function (including a function executed by a device and a function executed by software), a file, or software is selected as a combination of objects to be linked, a notification of a linkage function executable by using the combination may be controlled. For example, when a device image and a file image are sent to the assistant image 50, the specifying unit 28 may specify a linkage function executable by using the device associated with the device image and the file associated with the file image, and the controller 26 may display the information on the linkage function on the display unit of the UI unit 20 or output the information on the linkage function as voice information, as a notification of the information on the linkage function. As a specific example, when a device image associated with the multifunction machine B and a file image associated with a document file are transmitted to the assistant image 50, the specifying unit 28 specifies a linkage function executable by using the multifunction machine B and the document file (for example, a function of printing the document file by the multifunction machine B or a function of faxing the document file by the multifunction machine B). The controller 26 controls a notification of the information on the linkage function. Similarly, when a function image associated with software and a file image are sent to the assistant image 50, the specifying unit 28 may specify a linkage function executable by using the function associated with the function image and the file associated with the file image, and the controller 26 may control a notification of the information on the linkage function. As a specific example, when a function image associated with a document application and a file image associated with a document file are sent to the assistant image 50, the specifying unit 28 specifies a linkage function executable by using the document application and the document file (for example, a function of editing or outputting the document file by the document application).

In addition, when a device image, a function image, and a file image are sent to the assistant image 50, the specifying unit 28 may specify a linkage function executable by using the device associated with the device image, the function associated with the function image (for example, software), and the file associated with the file image, and the controller 26 may control a notification of the information on the linkage function. As a specific example, when a device image associated with the multifunction machine B, a function image associated with a document application, and a file image associated with a document file are transmitted to the assistant image 50, the specifying unit 28 specifies a linkage function executable by using the multifunction machine B, the document application, and the document file (for example, a function of editing the document file by the document application, outputting the document file to the multifunction machine B, and printing or faxing the document file by the multifunction machine B). In the specific examples described above, the combinations are merely examples. A linkage function executable by any combination of a device, a function, a file, and software other than the combinations described above may be set. In addition, information of a device, a function, a file, and software may be sent to the operation assistant by voice.

The first to fourth exemplary embodiments and Modifications 1 to 10 described above may also be applied when an automatic execution process by robotics process automation (RPA) is set. For example, when a setting person sends pieces of information on a device, a function, and a file to the operation assistant, a combination of the sent pieces of information and a linkage function associated with the combination are saved as setting contents, and a process is executed according to the setting contents. As for the RPA (Robotics Process Automation), for example, a routine process such as data input or a job executable by a combination of plural pieces of application software, a process such as data collection or analysis, or a process of learning and making a determination based on data may be performed.

Each of the terminal device 10, the devices 12 and 14, and the server 16 is implemented by, for example, cooperation of hardware and software. Specifically, each of the terminal device 10, the devices 12 and 14, and the server 16 includes one processor or plural processors such as a CPU (not illustrated). The function of each unit of the terminal device 10, the devices 12 and 14, and the server 16 is implemented in the manner that the one processor or the plural processors read and execute a program stored in a storage device (not illustrated). The program is stored in the storage device via a recording medium such as a CD or a DVD or a communication path such as a network. As another example, each unit of the terminal device 10, the devices 12 and 14, and the server 16 may be implemented by, for example, a hardware resource such as a processor, an electronic circuit, or an application specific integrated circuit (ASIC). For the implementation, a device such as a memory may be used. As yet another example, each unit of the terminal device 10, the devices 12 and 14, and the server 16 may be implemented by, for example, a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a plurality of devices, by transmitting information of the plurality of devices to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the plurality of devices in response to receiving the information of the plurality of devices, and the notification of the linkage function is displayed on the display.

2. The information processing device according to claim 1, wherein the controller controls the notification of the linkage function when the information is transmitted to the artificial intelligence operation assistant within a time limit.

3. The information processing device according to claim 1, wherein the controller controls the notification of the linkage function according to an order of transmitting the information to the artificial intelligence operation assistant.

4. The information processing device according to claim 1, wherein when a portion of an image as the information is transmitted to the artificial intelligence operation assistant, the controller controls the notification of the linkage function according to the portion.

5. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a plurality of functions, by transmitting information of the plurality of functions to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the plurality of functions in response to receiving the information of the plurality of functions, and the notification of the linkage function is displayed on the display.

6. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a device and a function, by transmitting information of the device and the function to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the device and the function in response to receiving the information of the device and the function, and the notification of the linkage function is displayed on the display.

7. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a plurality of files, by transmitting information of the plurality of files to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the plurality of files in response to receiving the information of the plurality of files, and the notification of the linkage function is displayed on the display.

8. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a plurality of pieces of software, by transmitting information of the plurality of pieces of software to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the plurality of pieces of software in response to receiving the information of the plurality of pieces of software, and the notification of the linkage function is displayed on the display.

9. An information processing device comprising:
a display;
a communication interface;
a memory that stores programs for implementing an artificial intelligence operation assistant or communicating with an artificial intelligence operation assistant in an external device through the communication interface; and
a controller that executes the programs in the memory to control a notification of a linkage function executable by using a combination of at least two of a device, a function, a file, and software, by transmitting information of the combination to the artificial intelligence operation assistant,
wherein the artificial intelligence operation assistant has a learning function, and the controller further changes the notification of the linkage function according to information obtained by the artificial intelligence operation assistant, wherein the artificial intelligence operation assistant determines the linkage function executable by using the combination of at least two of the device, the function, the file and the software in response to receiving the information of the combination of at least two of the device, the function, the file and the software, and the notification of the linkage function is displayed on the display.

10. The information processing device according to claim 9, wherein the controller controls the notification of the linkage function when an image as the information is connected to an image associated with the artificial intelligence operation assistant.

11. The information processing device according to claim 9, wherein the controller controls the notification of the linkage function when at least one image as the information is superimposed on an image associated with the artificial intelligence operation assistant.

12. The information processing device according to claim 11, wherein
the at least one image includes a plurality of images, and
the controller further generates a composite image using the plurality of images, as the information, superimposed on the image associated with the artificial intelligence operation assistant.

13. The information processing device according to claim 11, wherein when a user performs an operation to superimpose the at least one image as the information on the image associated with the artificial intelligence operation assistant, the controller further executes a display presentation such that the at least one image as the information is sucked into the image associated with the artificial intelligence operation assistant.

14. The information processing device according to claim 13, wherein when the linkage function is not executable, the controller further executes a display presentation such that the at least one image as the information is ejected from the image associated with the artificial intelligence operation assistant.

15. The information processing device according to claim 11, wherein when a user performs an operation to superimpose the at least one image as the information on the image associated with the artificial intelligence operation assistant, the controller further executes a display presentation such that the at least one image as the information disappears from a position where the artificial intelligence operation assistant is displayed.

16. The information processing device according to claim 15, wherein when the linkage function is not executable, the controller further executes a display presentation such that the at least one image as the information is displayed again from the image associated with the artificial intelligence operation assistant.

17. A non-transitory computer readable medium storing a program that causes a computer to execute information processing, the information processing comprising:
   controlling a notification of a linkage function executable by using a plurality of devices, by transmitting information of the plurality of devices to an artificial intelligence operation assistant, and
   displaying the notification of the linkage function on a display,
   wherein the artificial intelligence operation assistant has a learning function,
   the information processing further comprises changing the notification of the linkage function according to information obtained by the artificial intelligence operation assistant,
   wherein the artificial intelligence operation assistant determines the linkage function executable by using the plurality of devices in response to receiving the information of the plurality of devices.

* * * * *